US007437237B2

(12) United States Patent
Murakado

(10) Patent No.: US 7,437,237 B2
(45) Date of Patent: Oct. 14, 2008

(54) POSITIONING CONTROL APPARATUS AND THE METHOD

(75) Inventor: Kenichi Murakado, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1077 days.

(21) Appl. No.: 10/135,035

(22) Filed: Apr. 30, 2002

(65) Prior Publication Data

US 2003/0034928 A1 Feb. 20, 2003

(30) Foreign Application Priority Data

Aug. 17, 2001 (JP) ............................ 2001-248220

(51) Int. Cl.
*G06F 19/00* (2006.01)
*G05D 1/08* (2006.01)

(52) U.S. Cl. ...................................... 701/121; 244/182

(58) Field of Classification Search ................ 359/554, 359/556, 557; 244/3.11, 17.13, 158.1, 178, 244/181–182, 76 B; 701/7, 12, 14, 42, 70, 701/4, 13, 120, 121
See application file for complete search history.

(56) References Cited

U.S. PATENT DOCUMENTS 5,043,857 A * 8/1991 Kirchberg, Jr. et al. ........ 363/41
5,628,267 A * 5/1997 Hoshio et al. ............... 114/122
6,189,836 B1 * 2/2001 Gold et al. .................. 244/191
6,330,278 B1 * 12/2001 Masters et al. .............. 375/223
6,384,976 B1 * 5/2002 Ishijima et al. ............. 359/557
6,515,799 B2 * 2/2003 Ishijima et al. ............. 359/557
6,522,992 B1 * 2/2003 McCall et al. .............. 702/141
2003/0105588 A1 * 6/2003 Lin et al. ....................... 702/1

FOREIGN PATENT DOCUMENTS

JP 7-78001 3/1995
JP 2001-222324 8/2001

OTHER PUBLICATIONS

Japanese Office Action mailed Mar. 14, 2006, with translation.

* cited by examiner

*Primary Examiner*—David Hung Vu
*Assistant Examiner*—Minh Dieu A
(74) *Attorney, Agent, or Firm*—Katten Muchin Rosenman LLP

(57) ABSTRACT

A positioning control apparatus including feedback loops according to a plurality of control modes which control positioning of an object to be controlled is provided, in which the positioning control apparatus includes a part (121, 122, 123, 124) for reflecting a control process performed by a control mode before being switched in a control process performed by a control mode after being switched when a control mode is switched to another control mode. For example, an operation parameter on the control mode before being switched is dynamically reflected in the control mode after being switched.

14 Claims, 34 Drawing Sheets

FIG.17

| No. | PARAMETER NAME | PARAMETERS | <OUTPUT OF COMPUTING PART> | DESTINATION OF SIGNAL OUTPUT |
|---|---|---|---|---|
| 1 | MOTOR CURRENT INSTRUCTION VOLTAGE LIMIT VALUE | VOLTAGE DECISION PARAMETER | REFLECTION RATIO OF TARGET ANGLE WITH RESPECT TO SHIP→<br>ANGULAR ACCELERATION GAIN REFLECTION RATIO→<br>ANGULAR VELOCITY INSTRUCTION CORRECTION VALUE→<br>ANGULAR VELOCITY REFLECTION RATIO→ | PROCESSOR 123<br>PROCESSOR 121<br>PROCESSOR 140<br>PROCESSOR 122 |
| 2 | ANGULAR ACCELERATION GAIN REFERENCE SWITCHING RATIO | SWITCHING RATIO SETTING PARAMETER | ANGULAR ACCELERATION GAIN REFLECTION RATIO→ | ROCESSOR 121 |
| 3 | ANGULAR ACCELERATION GAIN OUTPUT LIMIT VALUE | OUTPUT LIMIT SETTING PARAMETER | - | ROCESSOR 121 |
| 4 | ANGULAR ACCELERATION GAIN OUTPUT FILTER CONSTANT | FILTER CONSTANT SETTING PARAMETER | - | PROCESSOR 121 |
| 5 | ANGULAR VELOCITY REFERENCE SWITCHING RATIO | SWITCHING RATIO SETTING PARAMETER | ANGULAR VELOCITY REFLECTION RATIO→ | PROCESSOR 122 |
| 6 | INSTRUCTION ANGLE REFERENCE SWITCHING RATIO WITH RESPECT TO SHIP | SWITCHING RATIO SETTING PARAMETER | INSTRUCTION ANGLE REFLECTION RATIO→ | PROCESSOR 123 |
| 7 | ANGLE LIMIT ANGLE WITH RESPECT TO SHIP(+) | ANGLE SETTING PARAMETER | - | PROCESSOR 123<br>PROCESSOR 140<br>PROCESSOR 122 |
| 8 | ANGLE LIMIT ANGLE WITH RESPECT TO SHIP(-) | ANGLE SETTING PARAMETER | - | PROCESSOR 123<br>PROCESSOR 140<br>PROCESSOR 122 |
| 9 | ANGULAR VELOCITY LIMIT ANGLE WITH RESPECT TO SHIP(+) | ANGLE SETTING PARAMETER | - | PROCESSOR 140<br>PROCESSOR 122 |
| 10 | ANGULAR VELOCITY LIMIT ANGLE WITH RESPECT TO SHIP(-) | ANANGLE SETTING PARAMETER | - | PROCESSOR 140<br>PROCESSOR 122 |
| 11 | ANGULAR VELOCITY LIMIT(±) | NPUT ANGULAR VELOCITY LIMIT PARAMETER | - | PROCESSOR 140 |
| 12 | MAXIMUM ALLOWABLE ANGULAR VELOCITY(+) | ANGULAR VELOCITY LIMIT PARAMETER | - | PROCESSOR 140 |
| 13 | MAXIMUM ALLOWABLE ANGULAR VELOCITY(-) | ANGULAR VELOCITY LIMIT PARAMETER | - | PROCESSOR 140 |
| 14 | MINIMUM ALLOWABLE ANGULAR VELOCITY(+) | ANGULAR VELOCITY LIMIT PARAMETER | - | PROCESSOR 140 |
| 15 | MINIMUM ALLOWABL ANGULAR VELOCITY(-) | ANGULAR VELOCITY LIMIT PARAMETER | | PROCESSOR 140 |
| 16 | ANGLE/ANGULAR VELOCITY LIMIT OUTPUT FILTER CONSTANT | FILTER CONSTANT SETTING PARAMETER | - | PROCESSOR 140 |

FIG.19

| No. | REFLECTION CONDITION | EQUATION | END CONDITION | FINAL VALUE |
|---|---|---|---|---|
| 1 | ANGLE CONTROL MODE WITH RESPECT TO SHIP → ANGLE CONTROL MODE WITH RESPECT TO SPACE | $f(u)=(\|u[1]\|\geqq u[2])\times u[4]+(\|u[1]\|<u[2])\times(u[4]+u[3])$ | $f(u)\geqq 1$ | $f(u)=1$ |
| 2 | ANGLE CONTROL MODE WITH RESPECT TO SPACE → ANGLE CONTROL MODE WITH RESPECT TO SHIP | $f(u)=(\|u[1]\|\geqq u[2])\times u[4]+(\|u[1]\|<u[2])\times(u[4]+u[3])$ | $f(u)\leqq 0$ | $f(u)=0$ |
| 3 | ANGLE CONTROL MODE WITH RESPECT TO SHIP → ANGULAR VELOCITY CONTROL MODE WITH RESPECT TO SPACE | $f(u)=(\|u[1]\|\geqq u[2])\times u[4]+(\|u[1]\|<u[2])\times(u[4]+u[3])$ | $f(u)\geqq 1$ | $f(u)=1$ |
| 4 | ANGULAR VELOCITY CONTROL MODE WITH RESPECT TO SPACE → ANGLE CONTROL MODE WITH RESPECT TO SHIP | $f(u)=(\|u[1]\|\geqq u[2])\times u[4]+(\|u[1]\|<u[2])\times(u[4]+u[3])$ | $f(u)\leqq 0$ | $f(u)=0$ |
| 5 | ANGLE CONTROL MODE WITH RESPECT TO SPACE → ANGULAR VELOCITY CONTROL MODE WITH RESPECT TO SPACE | $f(u)=1$ (FIXED) | - | $f(u)=1$ |
| 6 | ANGULAR VELOCITY CONTROL MODE WITH RESPECT TO SPACE → ANGLE CONTROL MODE WITH RESPECT TO SPACE | $f(u)=1$ (FIXED) | - | $f(u)=1$ |

FIG.21

| No. | REFLECTION CONDITION | EQUATION | END CONDITION | FINAL VALUE |
|---|---|---|---|---|
| 1 | ANGLE CONTROL MODE WITH RESPECT TO SHIP → ANGLE CONTROL MODE WITH RESPECT TO SPACE | $f(u)=(\|u[1]\| \geqq u[2]) \times u[4]+(\|u[1]\|<u[2]) \times (u[4]+u[3])$ | $f(u) \geqq 1$ | $f(u)=1$ |
| 2 | ANGLE CONTROL MODE WITH RESPECT TO SPACE → ANGLE CONTROL MODE WITH RESPECT TO SHIP | $f(u)=(\|u[1]\| \geqq u[2]) \times u[4]+(\|u[1]\|<u[2]) \times (u[4]+u[3])$ | $f(u) \leqq 0$ | $f(u)=0$ |
| 3 | ANGLE CONTROL MODE WITH RESPECT TO SHIP → ANGULAR VELOCITY CONTROL MODE WITH RESPECT TO SPACE | $f(u)=(\|u[1]\| \geqq u[2]) \times u[4]+(\|u[1]\|<u[2]) \times (u[4]+u[3])$ | $f(u) \geqq 1$ | $f(u)=1$ |
| 4 | ANGULAR VELOCITY CONTROL MODE WITH RESPECT TO SPACE → ANGLE CONTROL MODE WITH RESPECT TO SHIP | $f(u)=(\|u[1]\| \geqq u[2]) \times u[4]+(\|u[1]\|<u[2]) \times (u[4]+u[3])$ | $f(u) \leqq 0$ | $f(u)=0$ |
| 5 | ANGLE CONTROL MODE WITH RESPECT TO SPACE → ANGULAR VELOCITY CONTROL MODE WITH RESPECT TO SPACE | $f(u)=1$ (FIXED) | - | $f(u)=1$ |
| 6 | ANGULAR VELOCITY CONTROL MODE WITH RESPECT TO SPACE → ANGLE CONTROL MODE WITH RESPECT TO SPACE | $f(u)=1$ (FIXED) | - | $f(u)=1$ |

FIG.23A (WHEN SWITCHING CONTROL MODE)

| No. | REFLECTION CONDITION | EQUATION | END CONDITION | FINAL VALUE |
|---|---|---|---|---|
| 1 | ANGLE CONTROL MODE WITH RESPECT TO SHIP → ANGLE CONTROL MODE WITH RESPECT TO SPACE | $f(u)=(\|u[1]\|\geqq u[3])\times u[7]+(\|u[1]\|<u[3])\times(u[7]+u[4])$ | $f(u)\geqq 1$ | $f(u)=1$ |
| 2 | ANGLE CONTROL MODE WITH RESPECT TO SPACE → ANGLE CONTROL MODE WITH RESPECT TO SHIP | $f(u)=(\|u[1]\|\geqq u[3])\times u[7]+(\|u[1]\|<u[3])\times(u[7]+u[4])$ | $f(u)\leqq 0$ | $f(u)=0$ |
| 3 | ANGLE CONTROL MODE WITH RESPECT TO SHIP → ANGULAR VELOCITY CONTROL MODE WITH RESPECT TO SPACE | $f(u)=(\|u[1]\|\geqq u[3])\times u[7]+(\|u[1]\|<u[3])\times(u[7]+u[4])$ | $f(u)\geqq 1$ | $f(u)=1$ |
| 4 | ANGULAR VELOCITY CONTROL MODE WITH RESPECT TO SPACE → ANGLE CONTROL MODE WITH RESPECT TO SHIP | $f(u)=(\|u[1]\|\geqq u[3])\times u[7]+(\|u[1]\|<u[3])\times(u[7]+u[4])$ | $f(u)\leqq 0$ | $f(u)=0$ |
| 5 | ANGLE CONTROL MODE WITH RESPECT TO SPACE → ANGULAR VELOCITY CONTROL MODE WITH RESPECT TO SPACE | $f(u)=1\times(u[2]\geqq u[6])\times(u[2]\leqq u[5])$ | – | $f(u)=1$ |
| 6 | ANGULAR VELOCITY CONTROL MODE WITH RESPECT TO SPACE → ANGLE CONTROL MODE WITH RESPECT TO SPACE | $f(u)=1\times(u[2]\geqq u[6])\times(u[2]\leqq u[5])$ | – | $f(u)=1$ |

FIG.23B (WHEN SWITCHING DRIVING REGION)

| No. | REFLECTION CONDITION | EQUATION | | NOTE |
|---|---|---|---|---|
| 1 | ANGLE CONTROL MODE WITH RESPECT TO SHIP | f(u)=0 (FIXED) | | ALWAYS REFLECT TO ANGULAR VELOCITY WITH RESPECT TO SHIP |
| 2 | ANGLE CONTROL MODE WITH RESPECT TO SPACE | f(u)=[(u[2]≧u[6])×(u[6]≦u[5])×1<br>+(u[2]>u[7])× 0 +(u[2]<u[8])× 0<br>+(u[2]≧u[5])×(u[2]≦u[7])×{(u[7]−u[2])÷(u[7]−u[5])}<br>+(u[2]≧u[8])×(u[2]≦u[6])×{(u[2]−u[8])÷(u[6]−u[8])} | →[RANGE OF REFLECTION OF ANGULAR VELOCITY WITH RESPECT TO SPACE]<br>→[RANGE OF REFLECTION OF ANGULAR VELOCITY WITH RESPECT TO SHIP]<br>→[RANGE OF REFLECTION OF MIXED ANGULAR VELOCITY]<br>→[RANGE OF REFLECTION OF MIXED ANGULAR VELOCITY] | MIXED CONTROL OF ANGULAR VELOCITY WITH RESPECT TO SPACE AND ANGULAR VELOCITY WITH RESPECT TO SHIP |
| 3 | ANGULAR VELOCITY CONTROL MODE WITH RESPECT TO SPACE | | | |

POSITIONING CONTROL APPARATUS AND THE METHOD

BACKGROUND OF THE INVENTION

1. Field of the Invention

The present invention relates to a method of switching control for suppressing required torque and realizing high optical axis stability in a space stabilizer in an infrared imaging device and the like which is mounted on an airplane or a ship.

2. Description of the Related Art

The space stabilizer includes a so-called gimbal. The gimbal is an apparatus (mechanism) for keeping an object to be controlled such as a compass or a camera to be horizontal.

FIG. 1 is a figure for explaining a general control mode of a gimbal. The following explanation is for a control example in which the gimbal is mounted in a ship.

There are three gimbal control modes as shown in FIG. 1. The three gimbal control modes are an angle control mode with respect to ship M1, an angle control mode with respect to space M2 and an angular velocity control mode with respect to space M3. Each mode has following functions.

The angle control mode with respect to ship M1 has a function of performing positioning control for the gimbal with respect to the ship. For example, the gimbal is oriented to a predetermined housing position and is fixed by braking the gimbal.

The angle control mode with respect to space M2 has a function of correcting shaking such that the optical axis is oriented to a fixed direction in the space when disturbance is applied. According to this mode, rotation and movement of an image is suppressed, and the center of the image is always directed to the same point at infinity.

The angular velocity control mode with respect to space M3 has a function for directing the optical axis to any direction.

The operation of the gimbal from power-up to power-down is performed by switching the three control modes M1-M3 by applying control commands from the outside.

FIG. 2 shows a gimbal control flowchart.

When power is turned on in step 1, the mode becomes the angle control mode with respect to ship M1. After releasing the brake of the gimbal in step 2, the mode is changed to the angle control mode with respect to space M2 by a switching process in step 3, so that shaking correction is performed. In the angle control mode with respect to space M2, a control command from outside is received and reflected in step 4. Then, the control mode is changed to a control mode corresponding to the command by a switching process corresponding to the received command (steps 5, 6; steps 8, 9) (steps 7, 10). When a command for power-down is received in step 11, the control mode is changed to the angle control mode with respect to ship M1 in step 12, and after positioning the gimbal at an stop angle of the gimbal with respect to the ship in step 13, the brake is applied (brake ON), and, then, the power is turned of in step 14.

In the following, a configuration of a control block for suppressing control error amount and for giving higher performance to the gimbal will be described.

Generally, the control block has three-fold control loops including an angular acceleration loop, an angular velocity loop and an angle loop, in which high accuracy for positioning the optical axis can be obtained by performing response in a high frequency region.

In the following, functions of each loop will be described.

The function of the angular acceleration loop is used for quickly responding always changing required torques and for suppressing disturbance, in which the required torques include a mechanical static/dynamical friction torque which changes due to ambient temperature, a wind pressure torque against a wind receiving surface of a ship when the ship runs in wind and rain, a disturbance torque such as an unbalance torque due to vibration/impact occurred by collision between wave and the ship, an inertial torque necessary for keeping the optical axis to be stable when the ship is shaking, and the like.

The function of the angular velocity loop is used for improving tracking responsivity to the angular velocity, that is, for improving tracking response speed to the angular velocity, wherein the angular velocity indicate the angular velocity with respect to space and the angular velocity with respect to the ship in this specification.

The function of the angle loop is used for improving tracking response characteristics with respect to the angle, that is, for improving positioning ability, wherein the angle indicates an angle with respect to space and an angle with respect to ship in this specification.

A block diagram of a control system of the angle control mode with respect to ship M1 is shown in FIG. 3.

The configuration of the control block has three-fold control loops including, from inside, an angular acceleration loop 10, an angular velocity loop with respect to ship 11 in which the angular velocity with respect to ship is a feedback signal, and an angle loop with respect to ship 12 in which the angle with respect to ship is a feedback signal.

The angular acceleration loop 10 includes a subtracter 13, an object to be controlled 14 including a servo amplifier, a motor (a driving device) and a load, an sensor 15 of angular velocity with respect to ship, a multiplier 16 calculating acceleration from the angular velocity with respect to ship, and a torque observer 17. The angular velocity loop 11 includes a subtracter 18 in addition to the angular acceleration loop 10. The angle loop 12 includes a part 20 of angle instruction with respect to ship, a subtracter 20, an angle compensator 22, a multiplier 23 calculating an angle from the angular velocity and a sensor 24 of angle with respect to ship.

The subtracter 21 calculates an angle error value between the instruction 20 of the angle with respect to ship and an actual angle with respect to ship detected by the sensor 24 of angle with respect to ship, and the angle error value is compensated by the angle compensator 22. The subtracter 18 calculates an angular velocity error value between an angular velocity instruction value output by the angle compensator 22 and an actual angular velocity with respect to ship detected by the sensor 15 of angular velocity with respect to ship, and the angular velocity error value is compensated by the angular velocity compensator 19. By calculating a torque feedback signal output from the torque observer 17 from a torque instruction value output from the angular velocity compensator 19 by using the subtracter 13. Then, the result value is applied to the servo amplifier in the object to be controlled 14 as a motor driving current instruction voltage, so that the motor is driven.

FIG. 4 shows a block diagram of a control system of the angle control mode with respect to space M2.

The control block has three-fold loops 12A including, from the inside loop, an angular acceleration loop 10, an angular velocity loop 11A with respect to space in which an angular velocity with respect to space is a feedback signal, an angle loop 12A with respect to space in which an angle with respect to space is a feedback signal. The angular acceleration loop 10 in FIG. 4 has the same configuration as the angular acceleration loop 10 shown in FIG. 3. The angular velocity loop 11A with respect to space is different from the angular velocity loop 11 with respect to space shown in FIG. 3 in that an angular velocity detected by a sensor 26 of angular velocity with respect to space is applied as feedback. In the angle loop 12A, a subtracter 28 calculates a difference between an angle of the gimbal with respect to ship and a ship shaking angle 27 (a ship gyro signal), and the difference is subtracted from a target angle instruction 25 with respect to space. The ship shaking angle 27 (a ship gyro signal) is a signal which is output by a ship gyro. The ship gyro is placed at a center bottom of the ship, and the ship gyro has an inertia body of a gimbal structure having three axes rotating at high velocity. The ship gyro detects and outputs angles of inclination with respect to the gimbal three axes (role axis, pitch axis, yawing axis) by controlling so as to keep the inertia body stable with respect to space. Therefore, the ship gyro outputs angles with respect to the three axes (that is, angles of shaking of the ship).

A control system of the angular velocity control mode with respect to space M3 is shown in a block diagram in FIG. 5.

The control block has two-fold control loops including, from inside loop, an angular acceleration loop 10 and an angular velocity loop 11B with respect to space in which the angular velocity with respect to space is a feedback signal. The angular acceleration loop 10 is the same as those shown in FIGS. 3 and 4. In the angular velocity loop 11B with respect to space, a subtracter 18 subtracts the angular velocity with respect to space from an angular velocity instruction 29 with respect to space, and the result is output to the angular velocity compensator 19.

In the control modes of the three systems, only the angular acceleration loop 10 is common. Since the feedback signals and control methods used in the angle loop and the angular velocity loop are different, excessively high torque is need to be applied to the motor if the control blocks are simply switched. Thus, oscillation and divergence occur due to the excessive output torque. Therefore, it is necessary to provide a switching means for suppressing torque between the three control modes.

Generally, since the gimbal mechanism has a drive range limit in an angle of elevation with respect to ship, it is necessary to provide an operating range limit (which will be called "mecha-limit" hereinafter) in the control system such that collision can be avoided, and it is necessary to recover operation when control amount becomes within operating range.

For example, in the angular velocity control mode with respect to space M3, when continuing to provide an instruction to move the optical axis to the mecha-limit angle direction, heavy collision occurs at the mecha-limit position so that the gimbal and the driving system are damaged if a means of avoiding the collision is not provided. In addition, it is necessary to provide a means of recovering from the mecha-limit point in order to recover the optical axis within the range of mecha-limit angle.

For example, in the angle control mode with respect to space M2, when the optical axis is spatially stabilized in the vicinity of the mecha-limit, that is, when shaking is corrected, there may be cases where the optical axis can not be stabilized since shaking can not be fully corrected within the gimbal operating range according to shaking condition. In this case, the gimbal shakes with the ship in a state that the angel of the gimbal with respect to the ship does not move at the mecha-limit, and it is necessary to recover shaking correction for stabilizing the optical axis with respect to space at the time when sum of the shaking angle and the angle of optical axis with respect to space becomes within the mecha-limit range.

FIG. 6 is a figure for explaining space stabilizing function limitation in the mecha-limit angle.

In this example, it is assumed that the mecha-limit is −60° (for the sake of simplicity, assuming that the optical axis forms a depression angle of the bow), and that shaking disturbance of ±10° is applied in a state that the angle of the optical axis with respect to space is −55°. The optical axis is spatially stabilized such that the optical axis is directed to a target when the gimbal is in the gimbal operating range. The gimbal is stopped with respect to the ship at the mecha-limit point, and shaking correction is recovered at the time when the gimbal comes into a target trackable range.

In the angle control mode with respect to ship M1, the gimbal is controlled such that the angle instruction value with respect to ship does not exceed the mecha-limit.

Following methods have been proposed as conventional switching methods between control modes of the three control systems shown in FIGS. 3-5.

A first conventional example of the switching method between the control modes is a method in which the control modes are switched by using the angle control loop. A control block of this first conventional example is shown in FIG. 7. In FIG. 7, the control block includes a switch (SW) 30, an angle instruction generation part 31, a subtracter 32, an angle compensator 33, a motor amplifier 34, a motor and load part 35, an integrator 36, a ship shaking angle 37, a switching judgment part 38, an adder 39 and an angle sensor with respect to ship 40.

In the angle control mode with respect to ship M1, the angle instruction generation part 31 outputs a target angle with respect to ship as an instruction angle in a state that the ship shaking angle 37 is not reflected by turning off the switch 30. In the angle mode with respect to space M2, the angle instruction generation part 31 outputs a target angle with respect to space as an instruction angle in a state that the ship shaking angle 37 is reflected by turning on the switch 30. For switching from the angle control mode M1 to the angle control mode M2, the switching judgment part 38 turns on the switch 30 for connecting the ship shaking angle 37 so that the gimbal is controlled for ship shaking. Normally, in order to improve tracking response ability at the start of connection, the switching judgment part 38 is used for connecting the ship shaking angle 37 when the gimbal angle error with respect to space is small.

In addition, when the angle control mode with respect to space M2 is switched to the angle control mode with respect to ship M1, the switching judgment part 38 turns off the switch 30 so as to disconnect the ship shaking angle, then, the angle of the gimbal with respect to the ship is controlled from the angle at the time of switching to the target retracting position by an angle instruction signal with respect to ship from the angle instruction generation part 31.

This method does not include the angular velocity control mode with respect to space M3. However, the optical axis can be directed to any direction by changing the instruction signal from the angle instruction generation part 31.

A second conventional example is a method of switching between the angle control and the angular velocity control, which is a servo control system disclosed in Japanese laid-open patent application No. 6-289937. A control block when the second conventional example is applied to this system is shown in FIG. 8. This control block includes an angle generation instruction part 31, a motor amplifier 34, a motor and load part 35, an integrator 36, a ship shaking angle 37, an angle sensor 40 with respect to ship, an angular velocity generation part 41, an angular velocity compensator 42, a switch (SW) 43, an angular velocity sensor 44 with respect to space, an adder 45, a subtracter 46, an angle compensator 47, a drift correction angle compensator 48, an adder 49 and a switching judgment part 50.

In the angle control mode with respect to ship M1, the switching judgment part 50 switches the switch 43 to the side of the angle control mode with respect to ship M1, and an angle instruction value with respect to ship from the angle instruction generation part 41 is output by using the angle sensor 40 with respect to ship so that the angle with respect to ship is controlled toward the target value.

In the angle control mode with respect to space M2, the switching judgment part 50 switches the switch 43 to the side of the angle control mode with respect to space M2, and an angular velocity instruction value with respect to space from the angular velocity instruction generation part 41 is output by using the angular velocity sensor 44 with respect to space so that the angular velocity with respect to apace is controlled toward the target value.

When the angle control mode M1 with respect to ship is switched to the angle control mode M2 with respect to space, the switching judgment part 50 switches the switch 43 to the angle control mode M2, and angular velocity control with respect to space is performed toward a target value which is the angular velocity instruction value with respect to space from the angular velocity instruction generation part 41 by using the angular velocity sensor 44 with respect to space.

Normally, the angular velocity sensor 44 with respect to space includes drift component. Therefore, it is necessary to form an angle loop in order to correcting the drift, in which the adder 49 adds the angle sensor 40 and the ship shaking angle 37 and a control constant of the drift correction angle compensator 48 is set such that response bandwidth becomes low frequency by which the drift can be removed.

Normally, for switching of the control modes, in order to improve tracking response ability at the time of connection start, the switching judgment part 50 connects a signal and tracks the ship shaking angle 37 after waiting for a difference between an angle instruction voltage and an angular velocity instruction voltage to become constant within an allowed range in a specified time.

In addition, in order to respond to torque shaped like step at the time of switching between the angle control mode and the angular velocity control mode, there are cases where gains of the angular velocity compensator 42 and the angle compensator 47 are decreased, or the gain of the angular velocity compensator 42 and the angle compensator 47 are changed from a state of decreased gain to an established gain.

In a third conventional example of the switching control method in the vicinity of the gimbal mecha-limit, an electrical limit switch, for example, is provided in the mecha-limit position, in which driving limitation is provided by using an electrical circuit such that, when a stopper pushes the electrical limit switch, the gimbal does not rotate in the pushing direction. There is a case where an angle signal with respect to ship is used as a judgment reference angle instead of using the electrical switch.

FIG. 9 shows a figure for explaining a limit control function according to the third conventional example.

In a driving mechanism which includes a limit plate 51 and rotates about the axis in the directions of CW (clockwise)/CCW (counterclockwise), two limit switches SW1 and SW2 are provided in fixed parts for detecting upper and lower mecha-limit angles. When the mechanical part reaches a limit point, the limit plate 51 pushes the switch SW1 or the switch SW2, and an instruction voltage output is restricted such that the limit plate does not rotate to the direction of the pushed switch for avoiding collision.

However, there are following problems in the first to third conventional examples.

The problem of the first conventional example is as follows.

The first conventional example is a cheap and simple method for correcting gimbal shaking. Since an angular velocity sensor is not used, the structure is simple. However, accuracy of positioning is bad, and response speed is low. In addition, there are problems in that, it is necessary to use a large torque motor which can output a torque for tracking response to angular velocity disturbance which is applied like steps, and the bore or the length of the motor becomes large. By using the switching judgment part, rising torque can be suppressed to some extent. However, a switch waiting time becomes necessary, and it may occur that switching start time becomes long according to a ship shaking condition. In addition, there is a problem in that tracking operation becomes unstable due to that a ship gyro signal shaped like step is applied when switching.

Problems of the second conventional example is as follows.

FIG. 10 shows a relationship between the angular velocity with respect to ship and the angle with respect to space when operation of the gimbal is spatially stable. Since phases of the angle control and the angular velocity control are different by 90°, the speed becomes maximum in a state where the gimbal angle with respect to ship and the shaking angle with respect to ship are almost the same (normally, tracking starts from a position where the angle with respect to ship is 0°) when the angle control mode with respect to ship is switched to the angular velocity control mode with respect to space. Therefore, large torque is necessary for switching in a shaking condition. Thus, switching process is difficult. Therefore, this method is suitable for the airplane and the like in which shaking is small. For the second conventional example, a large torque motor which can output torque for tracking response to angular velocity disturbance which is applied like steps is necessary. Thus, the gimbal becomes large. Comparing with the first conventional example, the space stabling ability is medium.

In addition, normally, since drift is included in the angle sensor itself, there is a problem in that the optical axis is drifted when control by the angular velocity instruction is performed. In order to avoid this problem, it is necessary to form an angle loop of low response bandwidth outside of the angular velocity loop.

By using the switching judgment part, it is possible that the rising torque can be suppressed to some extent. However, a time for waiting the start of switching by the judgment part is required, and a margin for the switching range used for switching judgment is necessary. Therefore, the step-like disturbance can not be removed so that tracking operation becomes unstable.

Problems of the third conventional example is as follows.

Although this method is a general method for restricting operation in the vicinity of mecha-limit, large step-like torque occurs due to deceleration/acceleration when stop/retracking occurs for switching at the limit point. Therefore, smooth stop/smooth retracking can not be performed, so that the gimbal may oscillate in some cases when switching is performed. Thus, it is necessary to use a large motor which can output torque for tracking the response. Therefore, the gimbal becomes large.

In the conventional methods of the first and second methods, since tracking is performed according to judgment condition of the switching processing part, high speed response ability for tracking is not realized. In addition, since the control is performed only by the angle loop and the angular velocity loop, the gimbal control error becomes large so that high performance can not be obtained.

There is a method for downsizing the motor other than the above-mentioned methods in which a speed reducer is used. However, there is a defect in that a positioning space of the speed reducer is necessary, response performance for the angle, the angular velocity and the angular acceleration is sacrificed.

SUMMARY OF THE INVENTION

An object of the present invention is to provide a positioning control apparatus and the method in which the above problems are solved and switching between control modes are performed smoothly with high precision.

More particularly, the object of the present invention is to provide a gimbal control apparatus and the method in which suppression ability against disturbance is improved, the gimbal can be controlled in a state where spatial stabilizing control error for the optical axis is very small, and tracking at the time of switching can be performed with small torque without time for waiting for start of switching for judgment.

In addition, the object of the present invention is to provide a gimbal control apparatus and the method in which stable tracking operation can be performed and the gimbal can be driven by a small motor of small output torque at the time of stop/restart at the mecha-limit point.

The above object of the present invention can be achieved by a positioning control apparatus including feedback loops according to a plurality of control modes which control positioning of an object to be controlled, the positioning control apparatus including:

a part for reflecting a control process performed by a control mode before being switched in a control process performed by a control mode after being switched when a control mode is switched to another control mode.

According to the present invention, since control of the control mode before being switched is reflected in the control mode after being switched, accurate positioning control which enables smooth switching between control modes can be realized.

BRIEF DESCRIPTION OF THE DRAWINGS

Other objects, features and advantages of the present invention will become more apparent from the following detailed description when read in conjunction with the accompanying drawings, in which:

FIG. 17 shows an example of operation parameters and the signal outputs which are set and stored in the example shown in FIG. 16;

FIG. 19 shows a list of control mode switching conditions and equations for each condition in the computing part of reflection ratio of instruction angle with respect to ship;

FIG. 21 shows a list of control mode switching conditions and the equations for each condition for the computing part of angular acceleration gain reflection ratio;

FIG. 23A shows control mode switching conditions and the equations for each condition;

FIG. 23B shows reflection conditions and equations for each condition for each driving region;

DETAILED DESCRIPTION OF THE PREFERRED EMBODIMENTS

First Embodiment

First, a first embodiment of the present invention on switching between three control modes M1-M3 from power-on to stop will be described.

Figure 11:
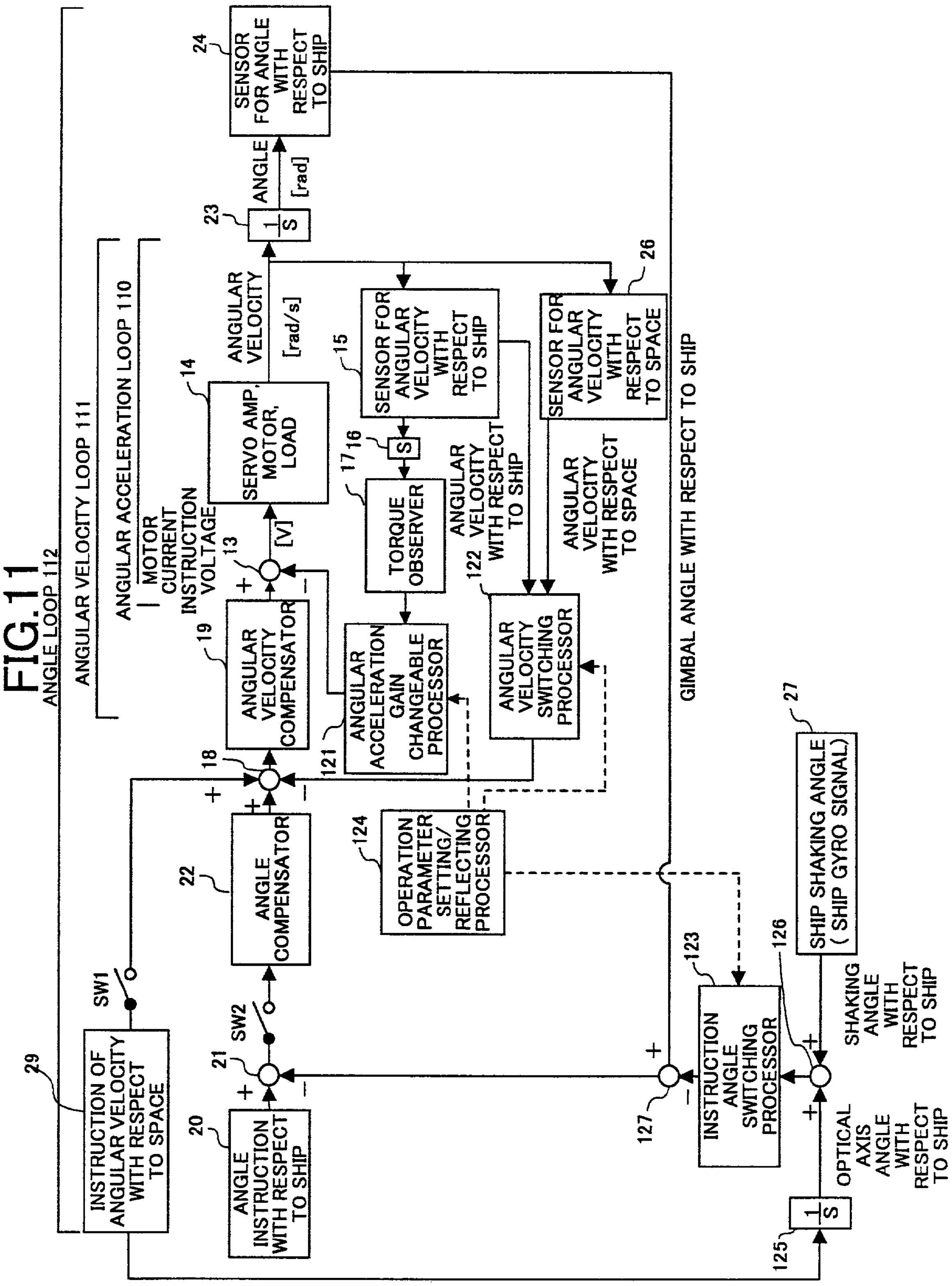
FIG. 11 is a block diagram showing a first embodiment of the present invention.

FIG. 11 is a block diagram showing a gimbal control apparatus according to the first embodiment of the present invention. In FIG. 11, same reference numbers are assigned to features same as those in the above mentioned configuration.

Figure 1:
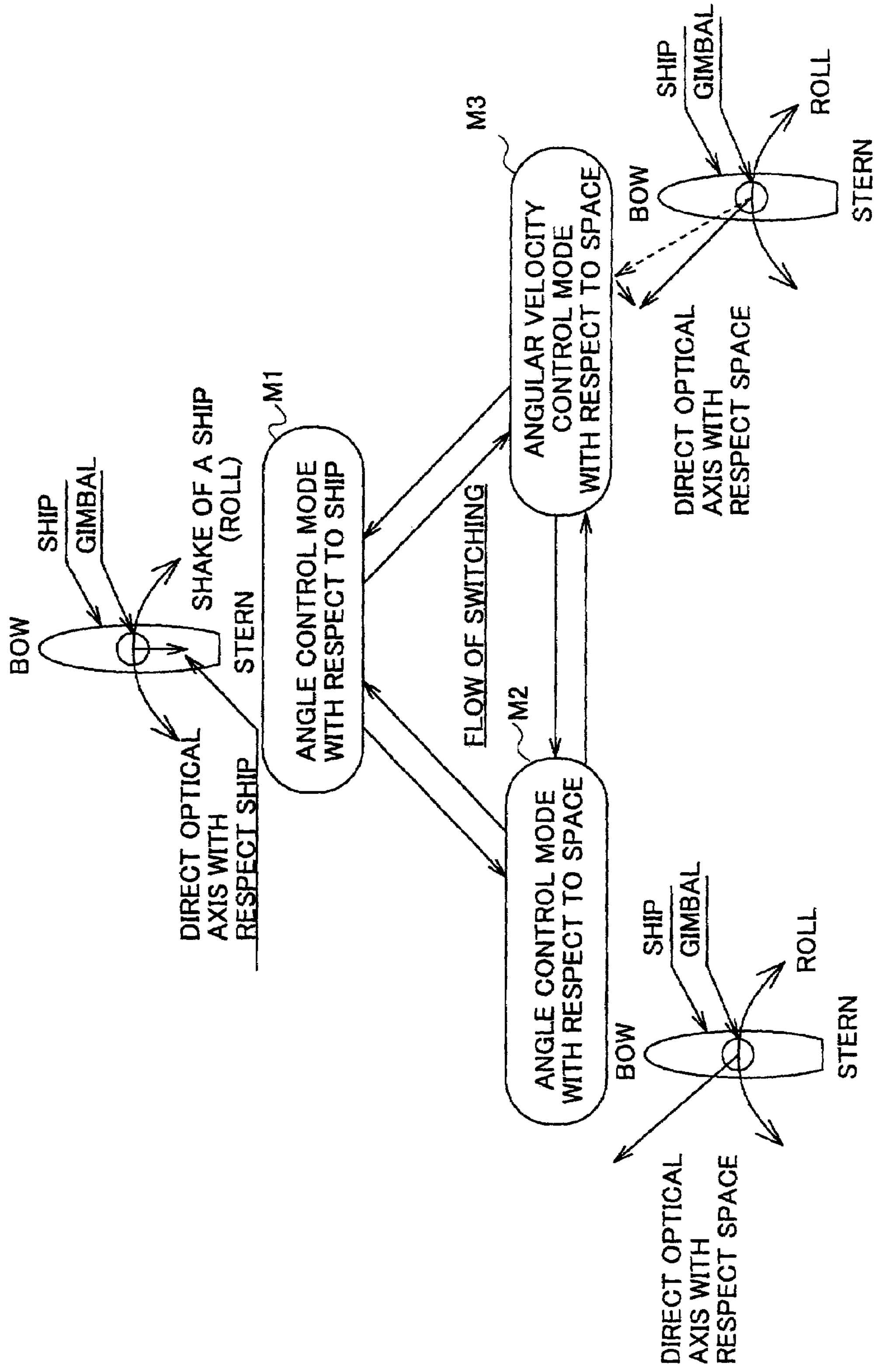
FIG.1 PRIOR ART
FIG. 1 is for explaining general control modes of a gimbal.
Figure 2:
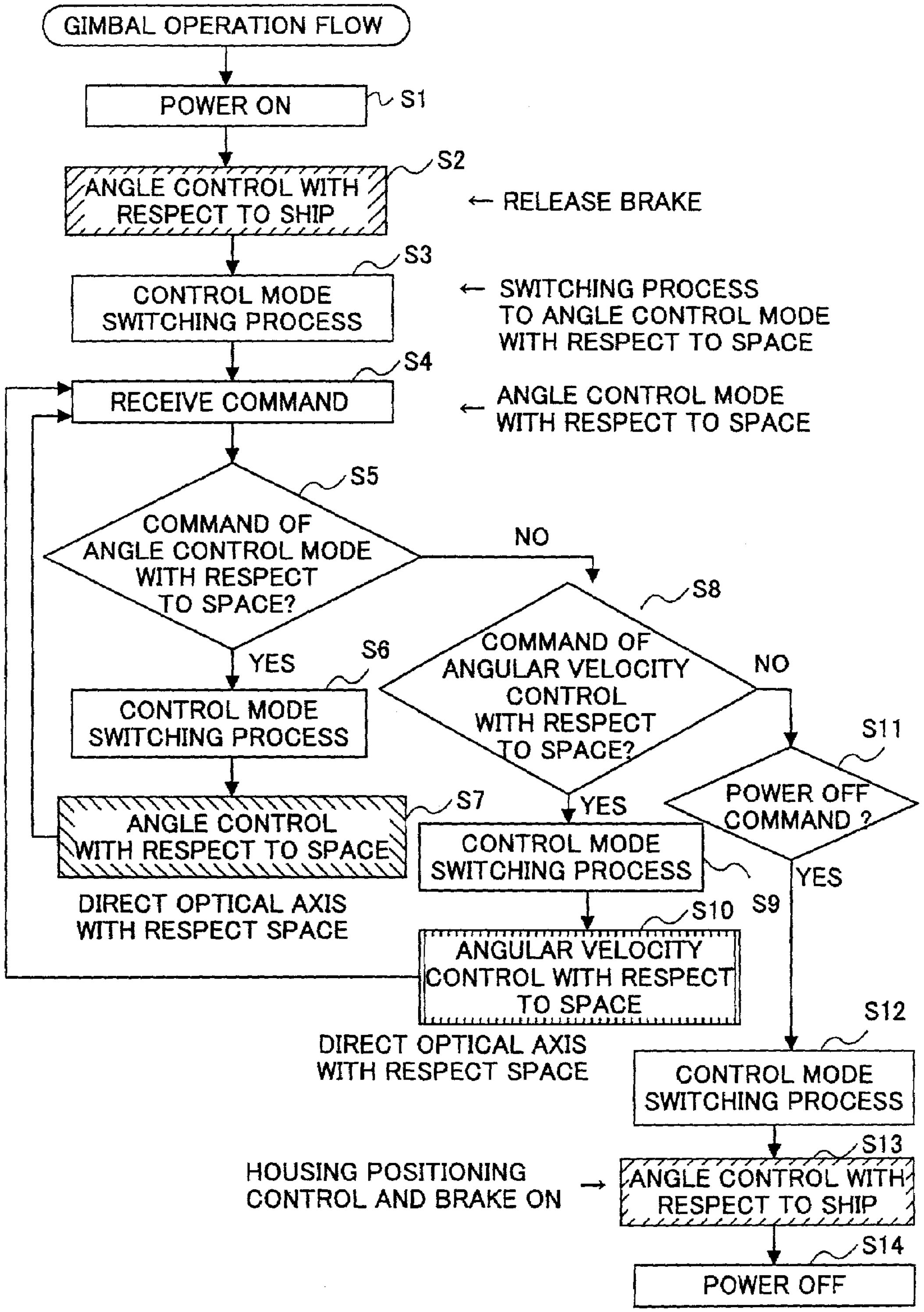
FIG.2 PRIOR ART
FIG. 2 shows a gimbal control flowchart.
Figure 3:
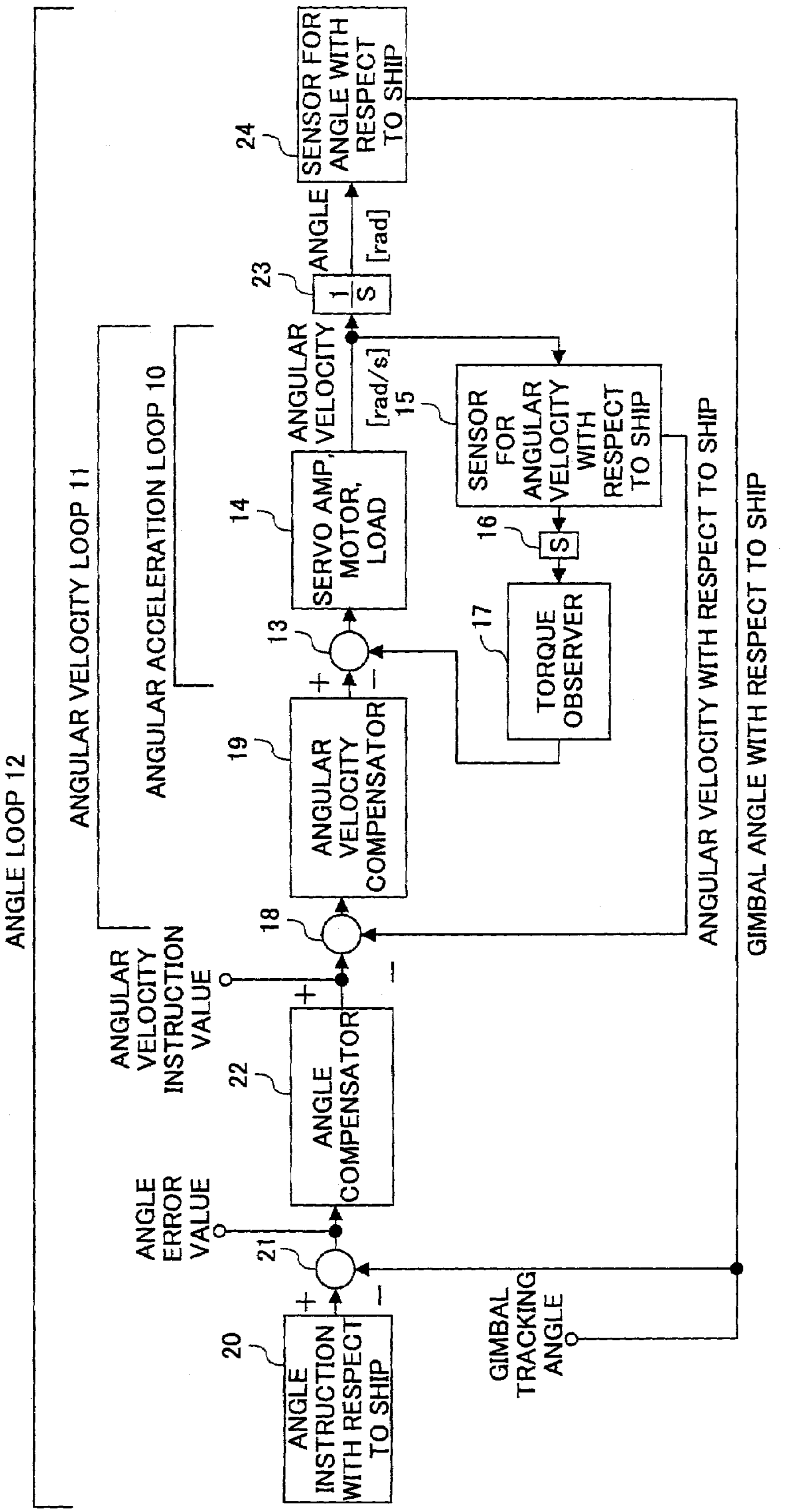
FIG.3 PRIOR ART
FIG. 3 is a block diagram of an angle control mode with respect to ship.
Figure 4:
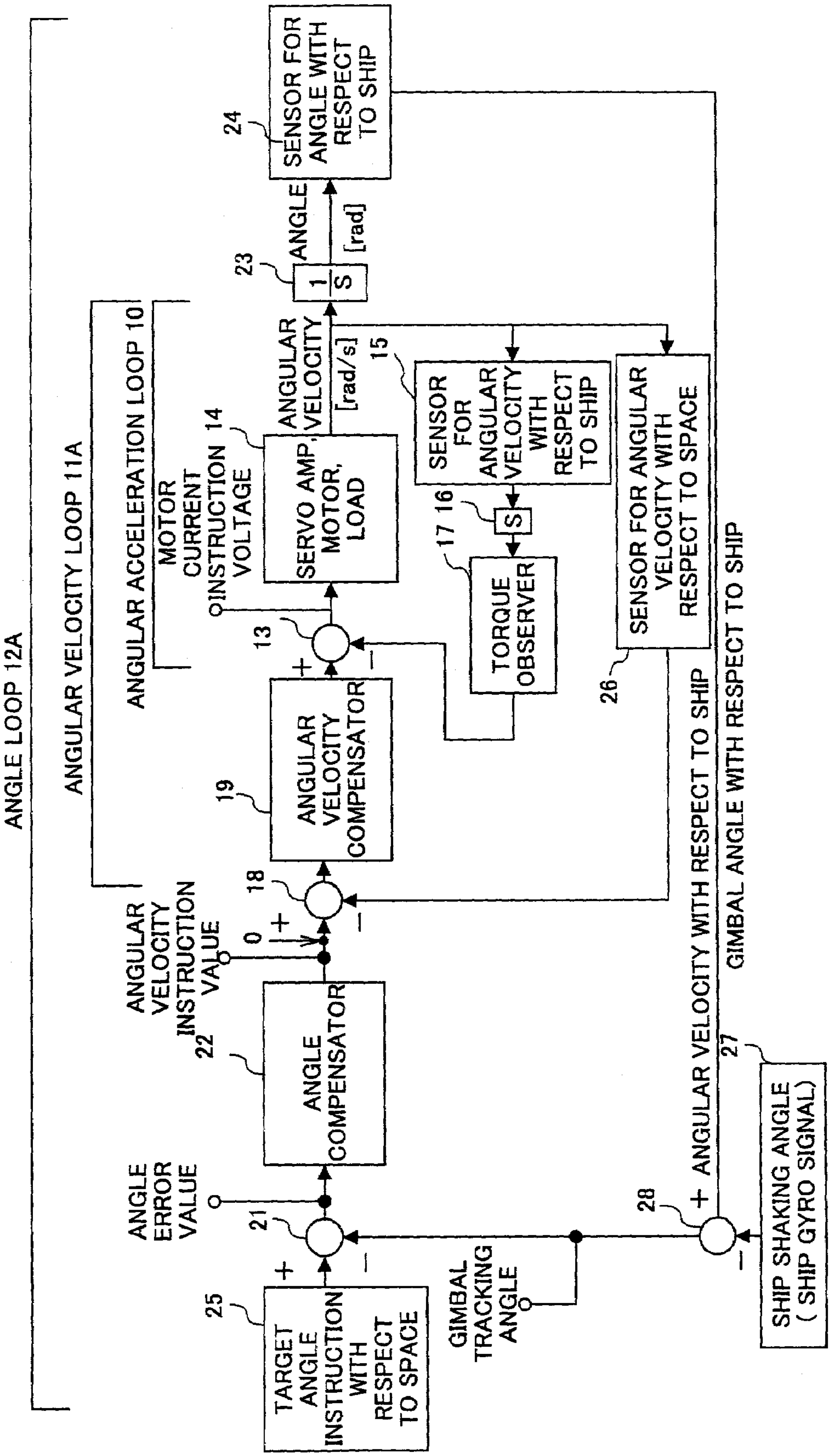
FIG.4 PRIOR ART
FIG. 4 is a block diagram of an angle control mode with respect to space.
Figure 5:
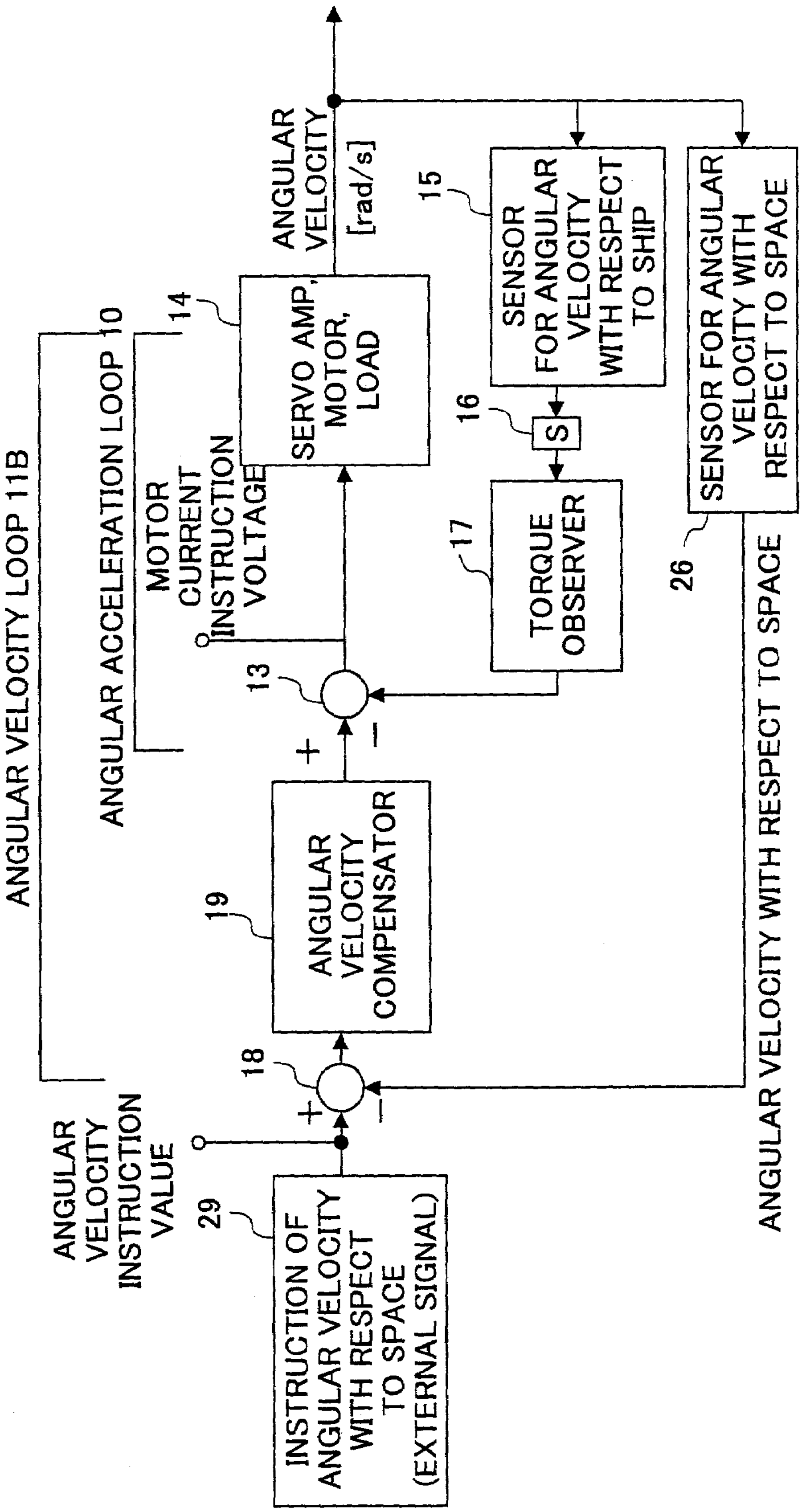
FIG.5 PRIOR ART
FIG. 5 is a block diagram of an angular velocity control mode with respect to space.
Figure 6:
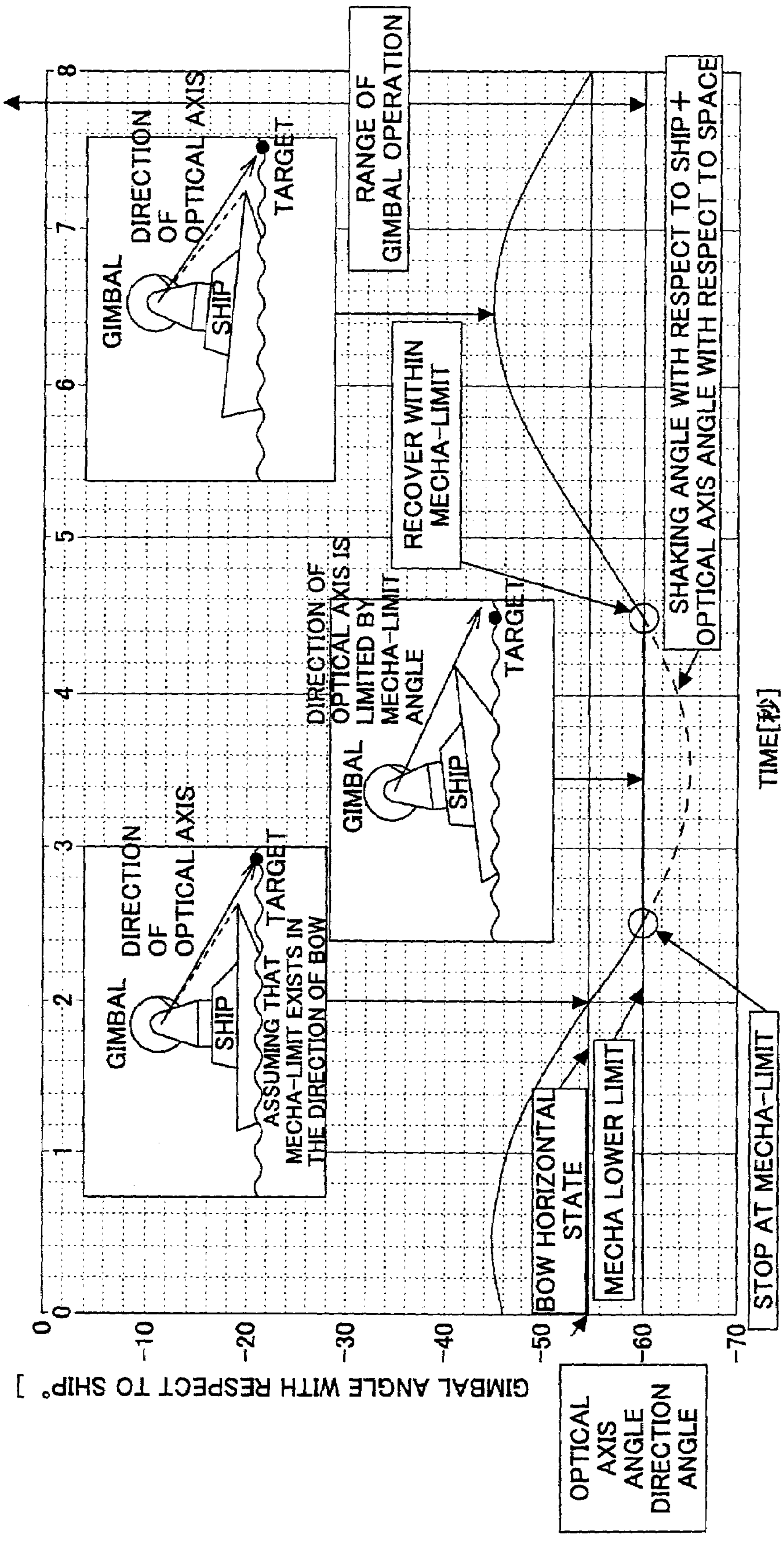
FIG.6 PRIOR ART
FIG. 6 is a figure for explaining space stabilizing function limitation in the mecha-limit angle.
Figure 7:
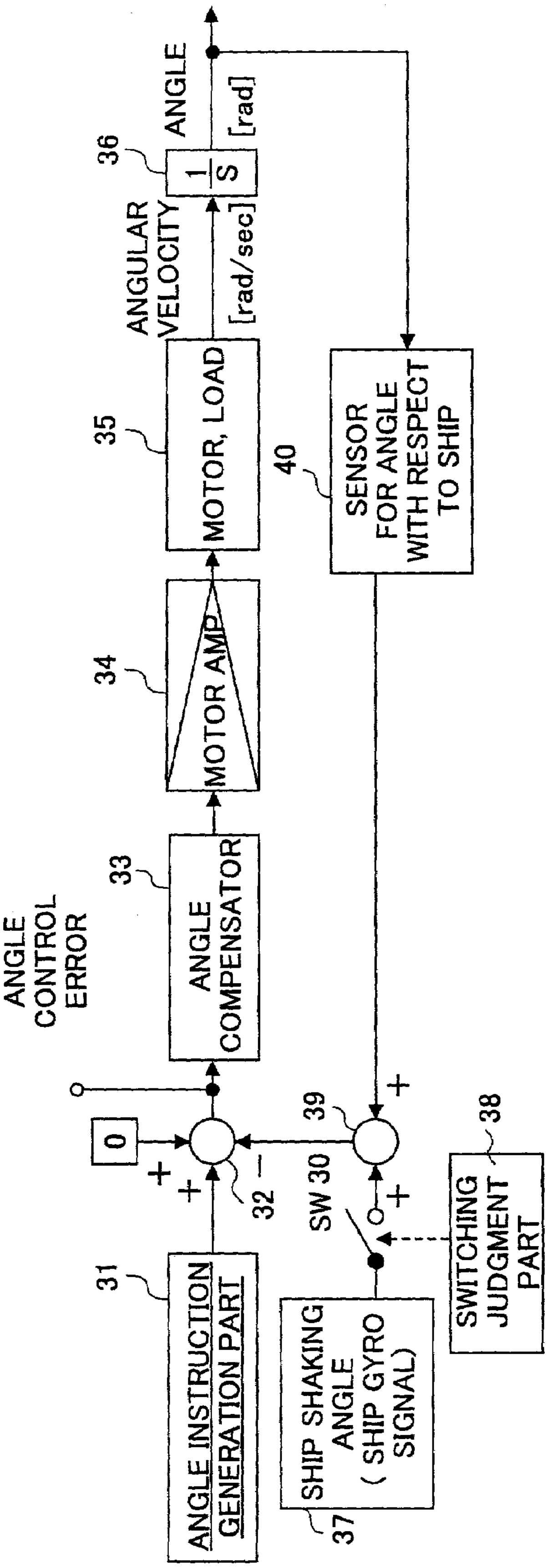
FIG.7 PRIOR ART
FIG. 7 is a control block diagram of a first conventional example.
Figure 8:
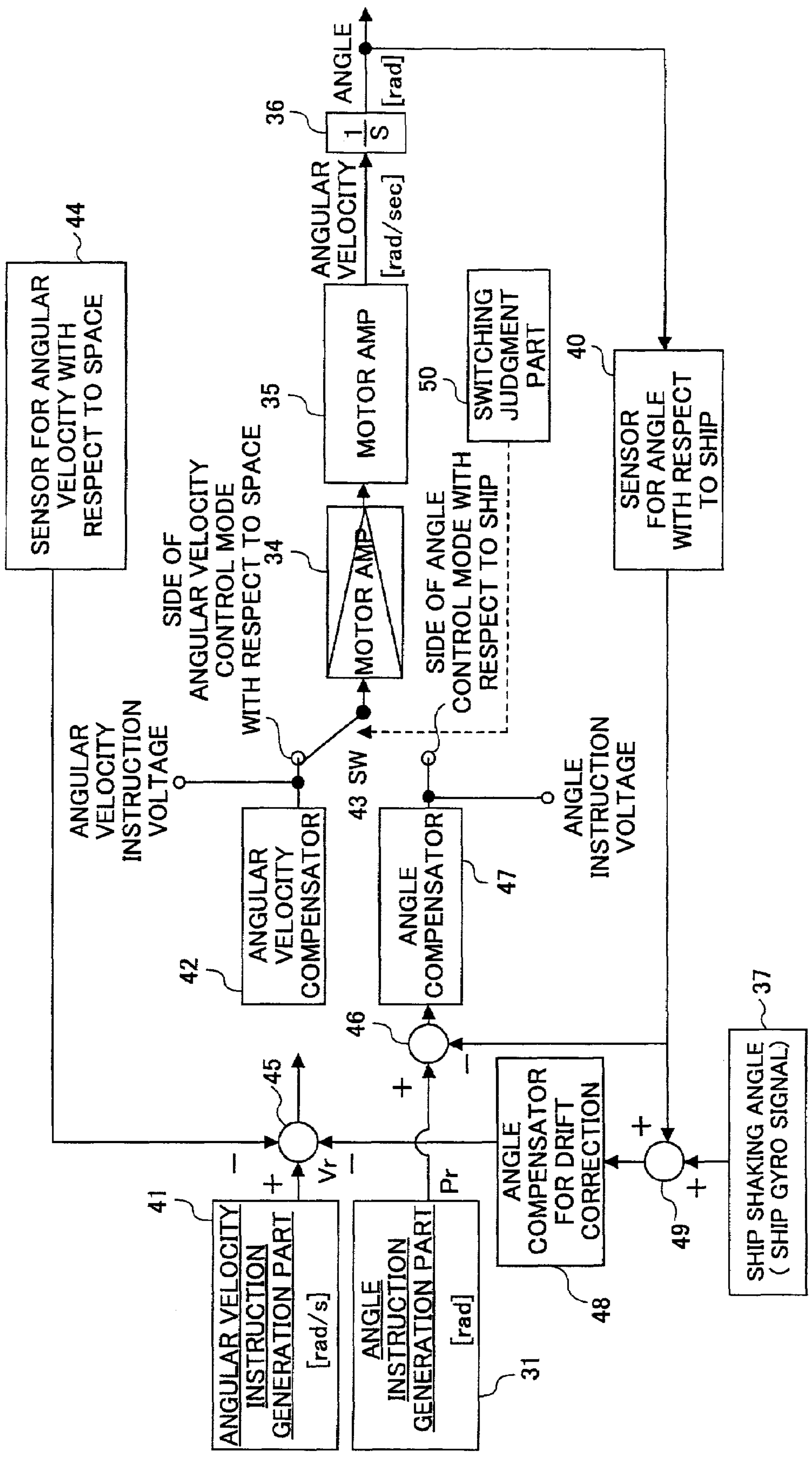
FIG.8 PRIOR ART
FIG. 8 is a control block diagram of a second conventional example.
Figure 9:
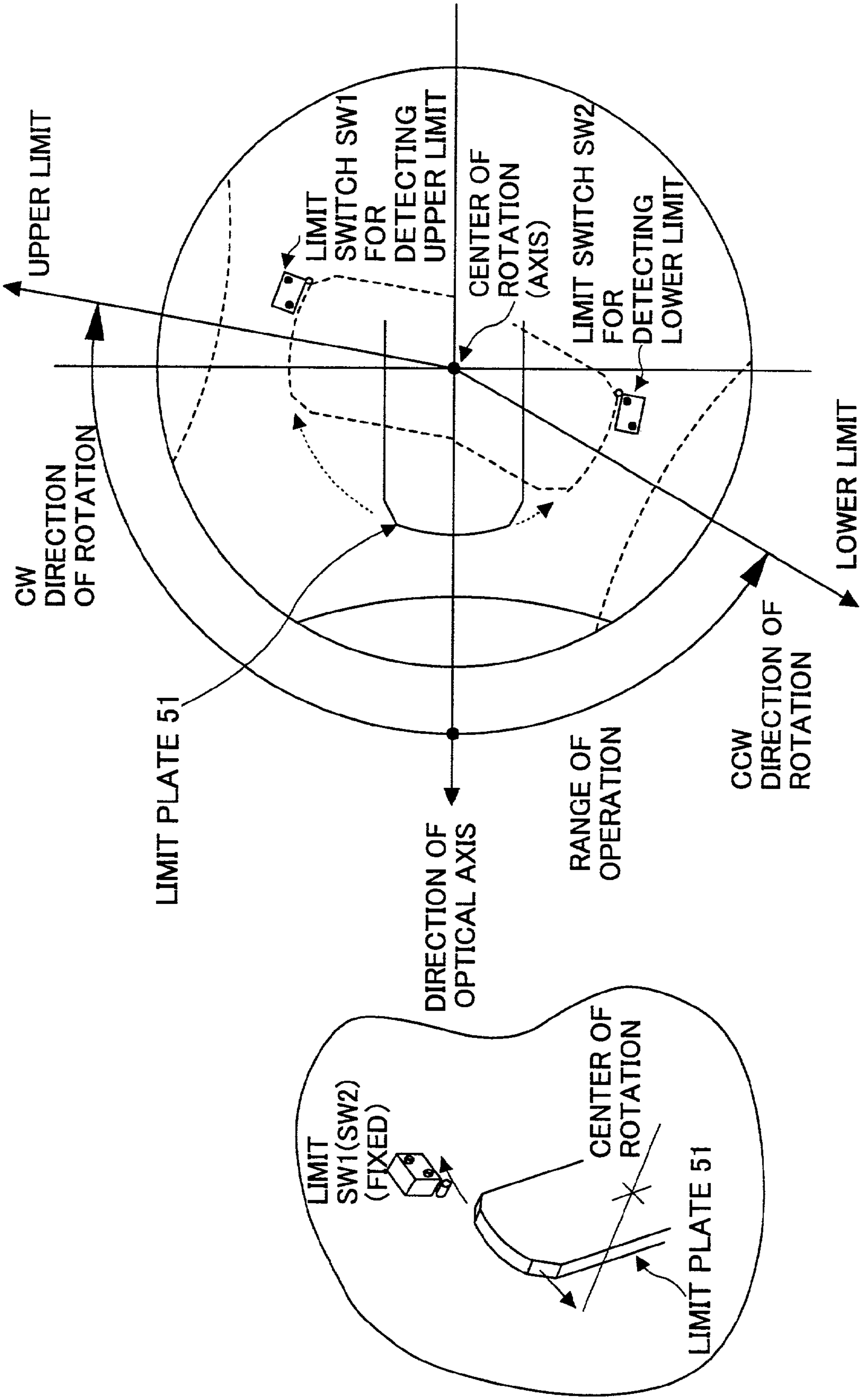
FIG.9 PRIOR ART
FIG. 9 is a control block diagram of a third conventional example.
Figure 10:
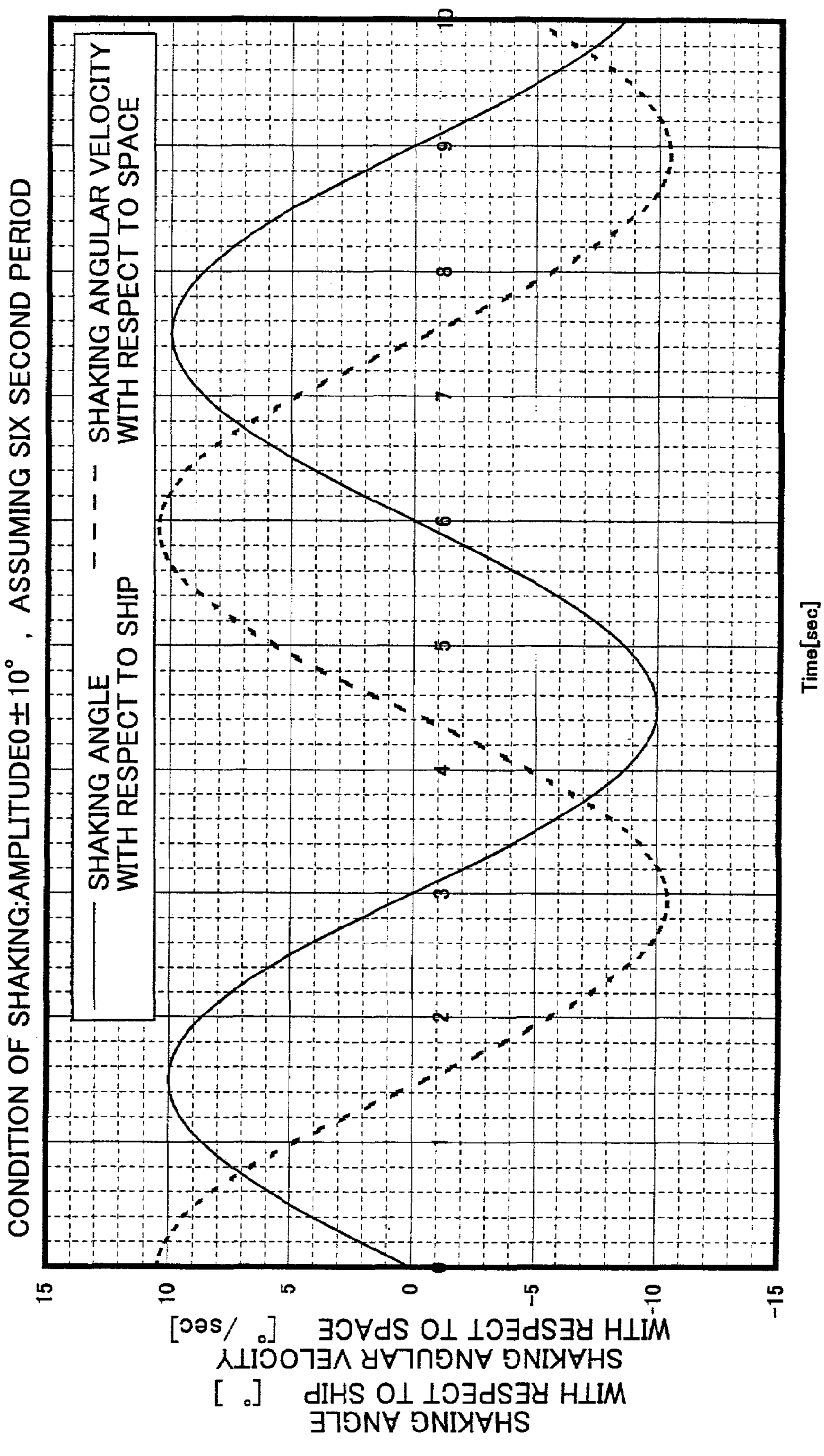
FIG.10 PRIOR ART
FIG. 10 shows a relationship between the angular velocity with respect to ship and the angle with respect to space when operation of the gimbal is spatially stable.

The gimbal control apparatus shown in FIG. 1 includes an angular acceleration loop 110, an angular velocity loop 111 and an angle loop 112. One of the characteristic of the present invention is that an angular acceleration gain changeable processor 121 is provided in the angular acceleration loop 110, an angular velocity switching processor 122 is provided in the angular velocity loop 111, an instruction angle switching processor 123 with respect to ship is provided in the angle loop 112, and an operation parameter setting/reflecting processor 124 for controlling the processors 121-123 are provided.

In addition, switches SW1 and SW2 are provided for performing switching between the angle control mode with respect to ship M1 and the angle control mode with respect to space M2.

The first embodiment shown in FIG. 11 includes the angular velocity switching processor 122 for switching between an angular velocity signal with respect to ship from an angular velocity sensor 15 which detects an angular velocity of the gimbal with respect to ship and an angular velocity signal with respect to space from an angular velocity sensor 26 which detects an angular velocity with respect to space, an angular acceleration gain changeable processor 121, and a processor 123 for switching instruction angle with respect to ship. According to this embodiment, a large output torque motor is not used, and tracking can be performed stably when switching the control mode without degrading spatial stabilizing performance. In other words, according to the first embodiment, operation parameter values on the control mode before switching are dynamically reflected to the control mode after switching.

In this configuration, by the angular velocity switching processor 122, each reflection ratio is multiplied to the angular velocity signal with respect to ship and the angular velocity signal with respect to space, and these are added so that angular velocity change becomes smooth at the time of switching of the angular velocity with respect to ship and the angular velocity with respect to space. The reflection ratio is a ratio (%) indicating to what extent an output signal of the angular velocity switching processor 122 depends on the angular velocity with respect to ship and the angular velocity with respect to space. In other words, the reflection ratio is a ratio of gain of the angular acceleration loop 110 and gain of the angular velocity loop 111 in the output signal of the angular velocity switching processor 122.

The angular acceleration gain changeable processor 121 has a function of changing the reflection ratio of the gain of the angular acceleration loop 110 from 0 to 100% and conforming to the step-like angular acceleration response at the time of control mode switching, so that angular acceleration change can be smoothed.

The processor 123 for switching instruction angle with respect to ship has a function of changing the reflection ratio of the instruction angle with respect to ship from 0 to 100% and changes the angle slowly to an actual shaking angle from the time of switching so that shaking disturbance change can be smoothed. The subtracter 127 subtracts output of the processor 123 for switching instruction angle with respect to ship from the angle of the gimbal with respect to ship, and outputs the result to the subtracter 21.

By combining the functions of the three processors, oscillation of the step-like driving torque can be removed, switching control can be performed within the range of motor output torque. As a result, a small motor considering only sum of disturbance suppression torque necessary for space stabilizing driving and inertia torques necessary for driving can be selected and used.

In addition, since it is not necessary to decrease a control parameter gain at the time of end of switching, accuracy (tracking accuracy) of spatial stabilizing control of the optical axis can be kept. In addition, since the reflection ratio of the instruction angle with respect to ship which is a main factor of the step-like torque can be smoothly changed from 0 to 100%, the waiting time becomes unnecessary at the time of control mode switching.

The operation parameter setting/reflection processing part 124 sets and stores operation parameters, and monitors a current instruction voltage to the servo amplifier 14, and controls change ratio from an angular velocity with respect to the ship to an angular velocity with respect to space, gain reflection ratio of the angle acceleration feedback loop 110, and a reflection ratio of the instruction angle with respect to ship such that current voltage applied to the motor does not exceed a motor instruction voltage limit value. In this configuration, since switching ratio which corresponds to the operation parameter which is set and stored by the processor 124 can be calculated and output, this method can be applied to other system in which shaking condition and mechanical structure are different by changing the operation parameter settings.

Figure 12:
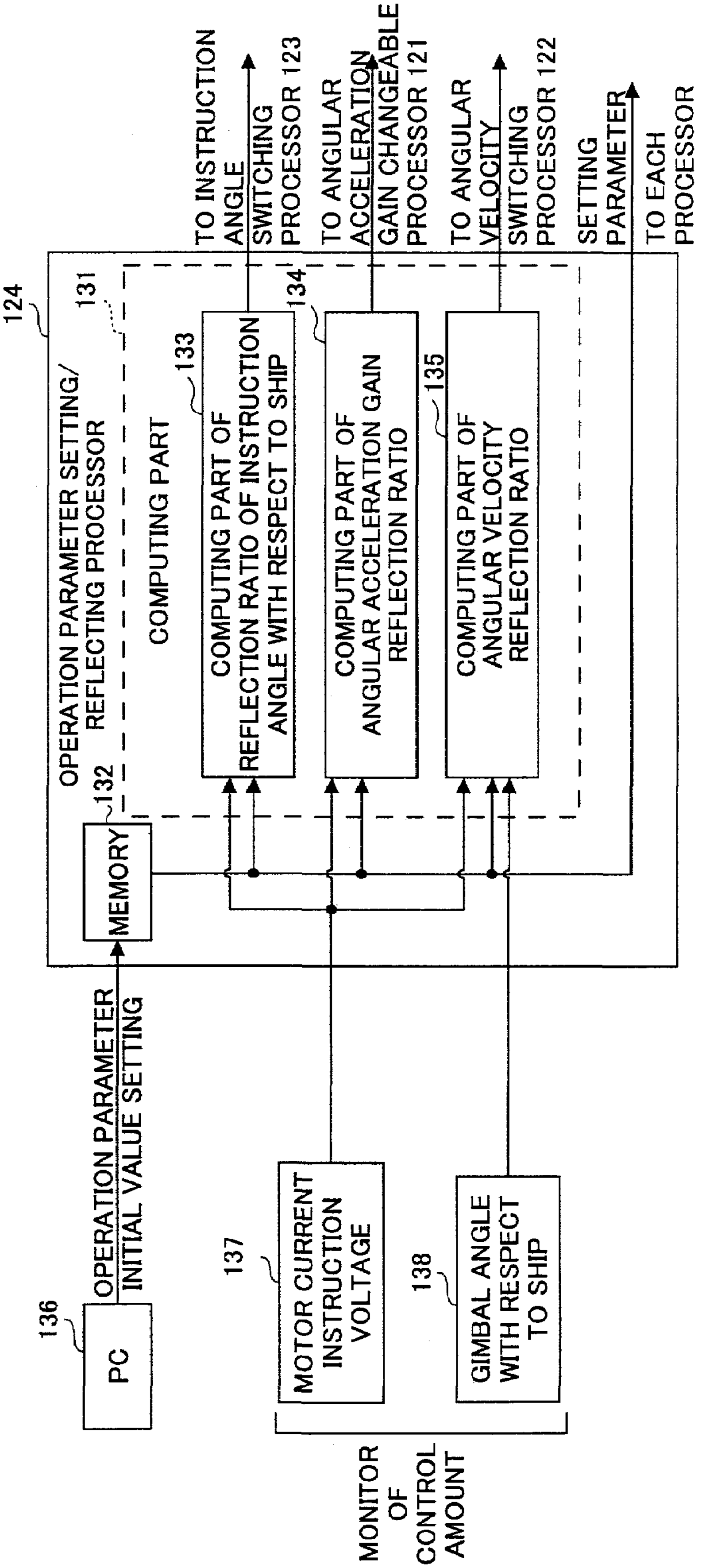
FIG. 12 shows a configuration example of an operation parameter setting/reflection processing part shown in FIG. 11.

FIG. 12 shows a configuration example of the operation parameter setting/reflection processing part 124. The operation parameter setting/reflection processing part 124 includes a computing part 131 and a memory part 132. The computing part 131 includes a computing part 133 of reflection ratio of instruction angle with respect to ship and a computing part 134 of angular acceleration gain reflection ratio, and a computing part 135 of angular velocity reflection ratio. The memory part 132 receives and stores operation parameters and initial value setting data provided by the personal computer 136.

The computing part 135 of angular velocity reflection ratio performs computing by using the parameter setting values at the time of switching, and generates a control signal to the angular velocity switching processor 122. More specifically, the computing part 135 of angular velocity reflection ratio controls reflection ratio of the angular velocity signal 138 with respect to ship from the angular velocity sensor 15 with respect to ship which detects the angular velocity with respect to the ship and an angular velocity signal with respect to space from the angular velocity sensor 26 with respect to space which detects angular velocity with respect to ship according to an initial setting reference switching ratio stored in the memory part 132 by the personal computer 136 and an equation of the motor current instruction voltage 137. In this configuration, the torque required for driving at the time of control mode switching can be suppressed within a rated torque which the motor can output, so that switching operation can be performed smoothly and in short time without waiting time for start.

The computing part 134 of angular acceleration gain reflection ratio performs computing by using the parameter values at the time of switching, and generates a control signal to the angular acceleration gain changeable processor 121. More specifically, the computing part 134 of angular acceleration gain reflection ratio changes the reflection ratio of gain of the angular acceleration loop 110 from 0 to 100% according to an equation using an initial setting increasing value stored in the memory part 132 by the personal computer 136 and the current instruction voltage 137. In this configuration, by changeably controlling the reflection ratio of the feedback response gain of the angular acceleration loop 110, necessary torque can be suppressed within a rated torque which the motor can output. As a result, transient response of the gimbal can be eliminated and the tracking operation of the gimbal can be completed smoothly in short time without waiting for start.

The computing part 133 of reflection ratio of instruction angle with respect to ship performs operation by using parameter values at the time of switching so as to generate a control signal to the processor 123 for switching instruction angle with respect to ship. More particularly, the computing part 133 of reflection ratio of instruction angle with respect to ship changes the reflection ratio of a shaking correction angle at the time of spatial stabilizing boot-up/stop indicated by the ship shaking angle (ship gyro signal) 27 according to an equation using the initial increment value and the motor current instruction voltage 137 from 0% to 100%. Accordingly, the computing part 133 of reflection ratio of instruction angle with respect to ship can suppress necessary torque within a rated torque which the motor can output by controlling the reflection ratio of the angle correction amount. Thus, transient response of the gimbal can be eliminated, and tracking operation of the gimbal can be completed in a short time without waiting time for start. It is desirable that the processor 123 for switching instruction angle with respect to ship receives a signal in which an optical axis angle with respect to ship output by the integrator 125 is added to the ship shaking angle (ship gyro signal) 27 by using the adder 126.

Second Embodiment

Figure 13:
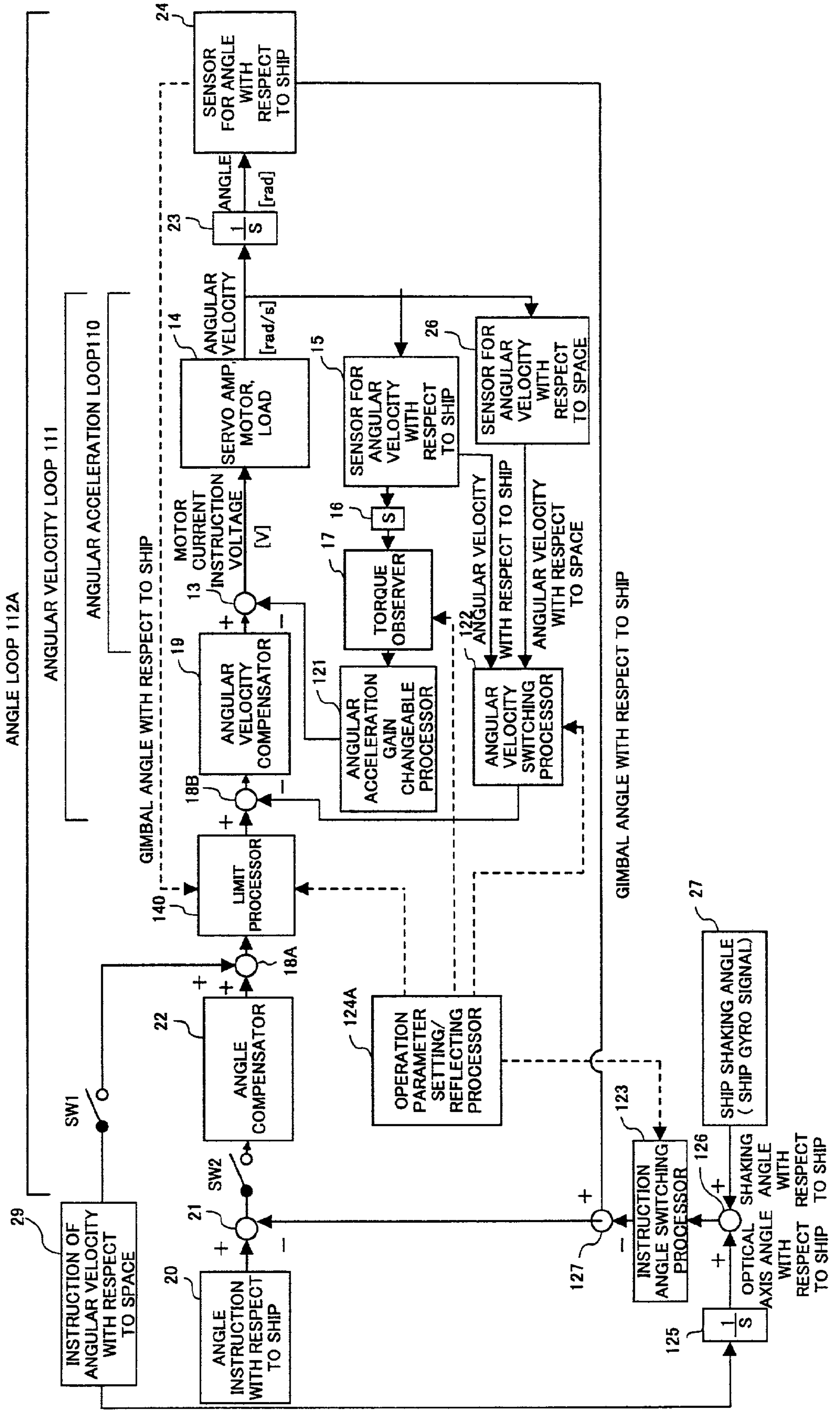
FIG. 13 is a block diagram showing a second embodiment of the present invention.

FIG. 13 is a block diagram showing a gimbal control apparatus according to the second embodiment of the present invention. In FIG. 13, same reference numbers are assigned to features same as those in the above mentioned configuration. The second embodiment relates to a switching method of the three control modes M1-M3 in the vicinity of the gimbal mecha-limit angle.

The configuration shown in FIG. 13 includes an angular velocity switching processor 122, an angle/angular velocity limit processor 140 provided in the angle loop 112A, and a processor 123 for switching instruction angle with respect to ship, wherein the angular velocity switching processor 122 changes a reflection ratio of an output signal of the angular velocity sensor 15 with respect to ship which detects an angular velocity with respect to ship and an output signal of the angular velocity sensor 26 with respect to space which detects angular velocity with respect to space according to an angle. The angle/angular velocity limit processor 140 is provided between an adder 18A and a subtracter 18B which are divided from a subtracter 18 shown in FIG. 11. According to this configuration, angle/angular velocity control operation with respect to space is performed when the instruction angle with respect to ship is within a gimbal operating angle range. And, when the shaking correction angle exceeds a gimbal mecha-limit setting angle, the mode is changed to a control mode with respect to ship, so that positioning control with respect to ship is performed. Thus, collision can be avoided in the vicinity of the operating angle limit point and switching can be performed smoothly. In other words, collision avoidance and recovery function can be realized by performing angle control with respect to space, angle control with respect to ship and mixed control in the vicinity of the gimbal mecha-limit point. In addition, an operating torque relieving function at the time of limitation range entry/exit is provided, and tracking/recovery operation can be performed smoothly with small driving torque.

The operation parameter setting/reflecting processor 124A sets/stores/reflects upper and lower angle limit values with respect to ship, upper and lower angular velocity limit values with respect to ship, and values of the maximum allowable angular velocity and the minimum allowable angular velocity as operation parameters. The processor 124A calculates and outputs reflection ratios to control signals for each of the angular velocity switching processor 122, the angle/angular velocity limit processor 140 and the processor 123 for switching instruction angle with respect to ship. In this configuration, a collision preventing function can be realized at the operating angle limit point which depends on the kind of gimbal by changing operating parameters according to shaking condition and mechanical structure.

Figure 14:
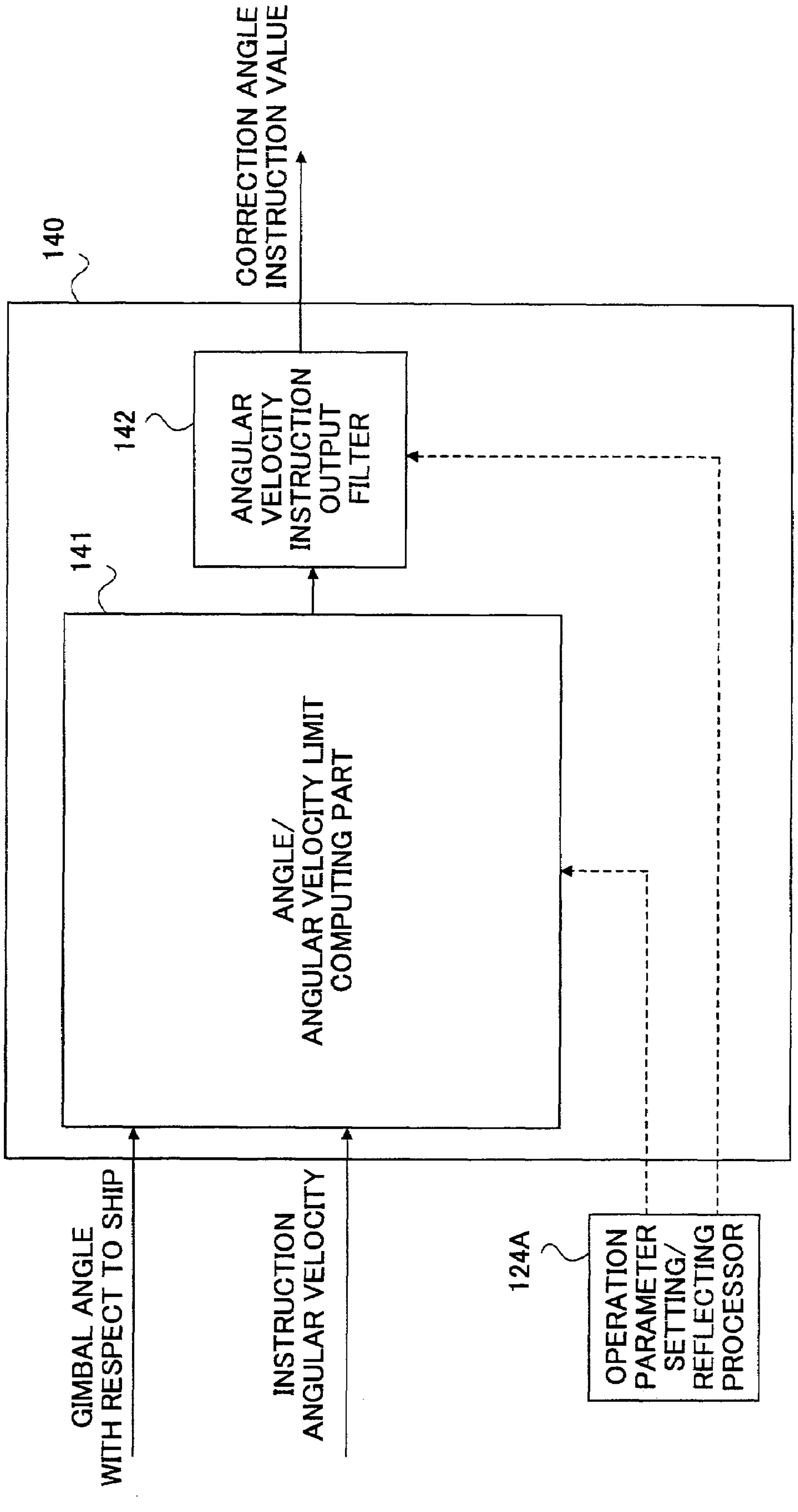
FIG. 14 shows an configuration example of an angle/angular velocity limit processor shown in FIG. 13.

FIG. 14 shows an configuration example of the angle/angular velocity limit processor 140. The angle/angular velocity limit processor 140 includes an angle/angular velocity limit computing part 141 and an angular velocity instruction output filter 142.

The angle/angular velocity limit computing part 141 observes an angle of gimbal with respect to ship, and changes reflection ratio of an angular velocity with respect to ship and an angular velocity with respect to space in the vicinity of the mecha-limit angle according to the angle of gimbal with respect to ship from 0% to 100%. That is, a region in which the angular velocity with respect to ship and the angular velocity with respect to space are mixed and reflected is provided in the vicinity of mecha-limit point, and switching of the angular velocity signals of the control mode with respect to space and the control mode with respect to ship is complemented. For example, the angular velocity with respect to ship is reflected 100% in a region where the angle exceeds the mecha-limit angel. In a mixing region, each of the reflection ratios of the angular velocities is changed from 0 to 100% such that the sum of the reflection ratios becomes 100%. In other spatially stabilized region, the angular velocity signal with respect to space is reflected 100%. Accordingly, since the angular velocity changes continuously in the vicinity of the mecha-limit, necessary driving torque can be suppressed, and collision avoidance/recovery function can be realized at the operating limit point. In addition, switching can be performed smoothly.

The angular velocity instruction output filter 142 corresponds to operation parameters established in the operation parameter setting/reflecting processor 124A, and performs filtering processing after adding angular velocity limitation. By this filtering processing, an angle of gimbal with respect to ship and an instruction angular velocity limiter are provided in a setting table, and the angle/angular velocity limit computing part which limits the input angular velocity on the basis the setting parameter and the angle of the gimbal with respect to ship is provided. Thus, according to the flittering processing, the multiplier effect of relieving the sudden angular velocity instruction. Therefore, sudden step-like input of the angular velocity can be eliminated, necessary driving torque can be suppressed, and collision avoidance/recovery function and smooth switching can be realized at the operating angle limit point.

Figure 15:
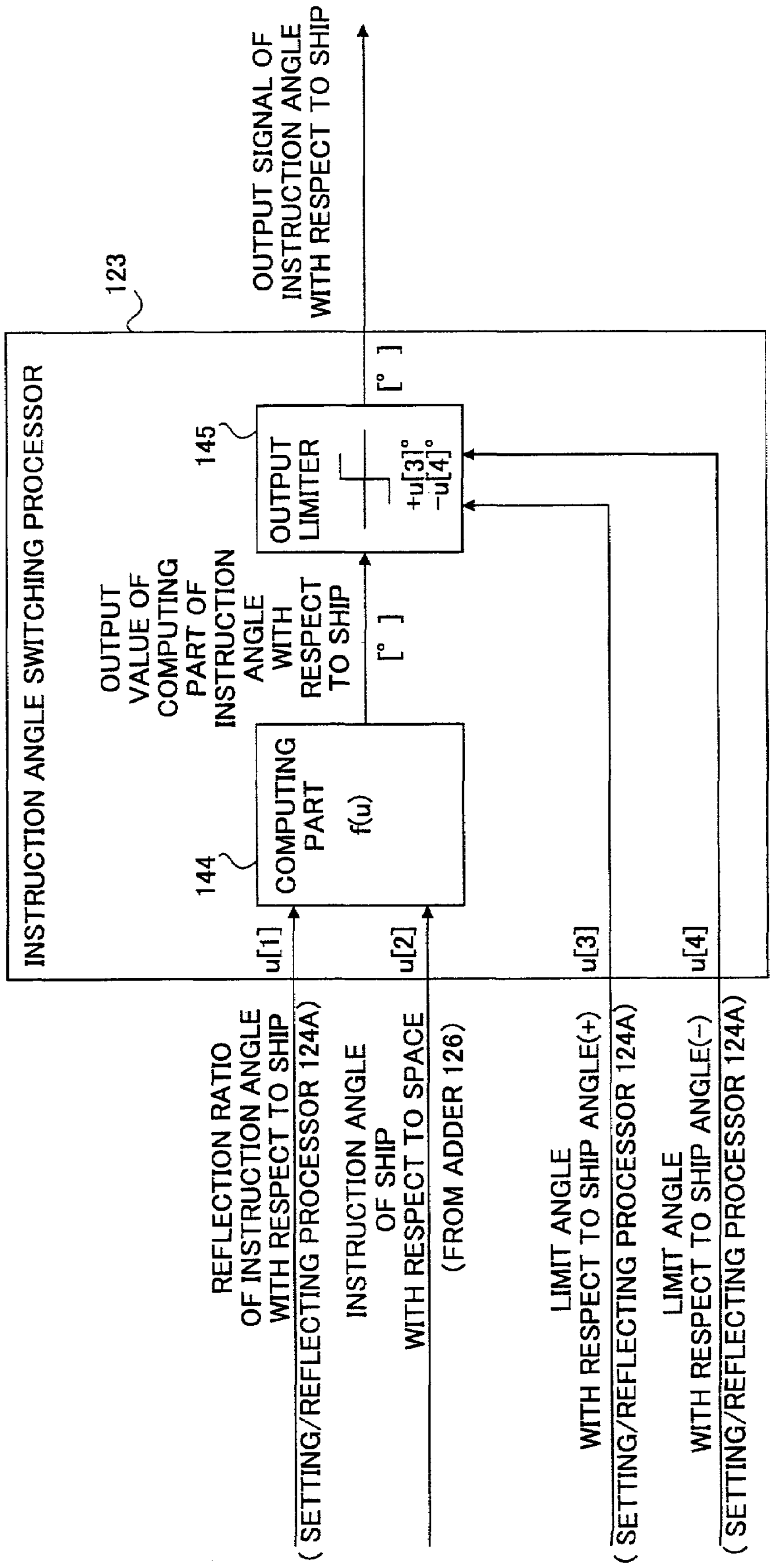
FIG. 15 shows an configuration example of a processor for switching instruction angle with respect to ship.

FIG. 15 shows an configuration example of the processor 123 for switching instruction angle with respect to ship. The processor 123 for switching instruction angle with respect to ship includes a computing part 144 and an output limiter 145. The computing part performs operation f(u) on a reflection ratio of instruction angle with respect to ship (u(1)) and an instruction with respect to space (u(2)) and calculates an output value of instruction angle with respect to ship and outputs the result to the limiter 145, wherein u(1) is established in the operation parameter setting/reflecting processor 124A and u(2) is from the adder 126. The output limiter 145 has a limiting-function in which received instruction angle with respect to ship is restricted according to an limit angle with respect to ship in plus side and minus side which are established by the operation parameter setting/reflecting processor 124A. In this configuration, by providing the output limiting function corresponding to the established limit angle, the instruction angle with respect to ship is controlled such that it does not exceed the mecha-limit, wherein the instruction angle with respect to ship is the sum of the correction angle with respect to ship and the optical axis angle with respect to space. Therefore, the gimbal can be controlled such that shaking larger than the operating angle limit point does not occur. Thus, collision avoidance and recovery can be performed with reliability.

EXAMPLE

Figure 16:
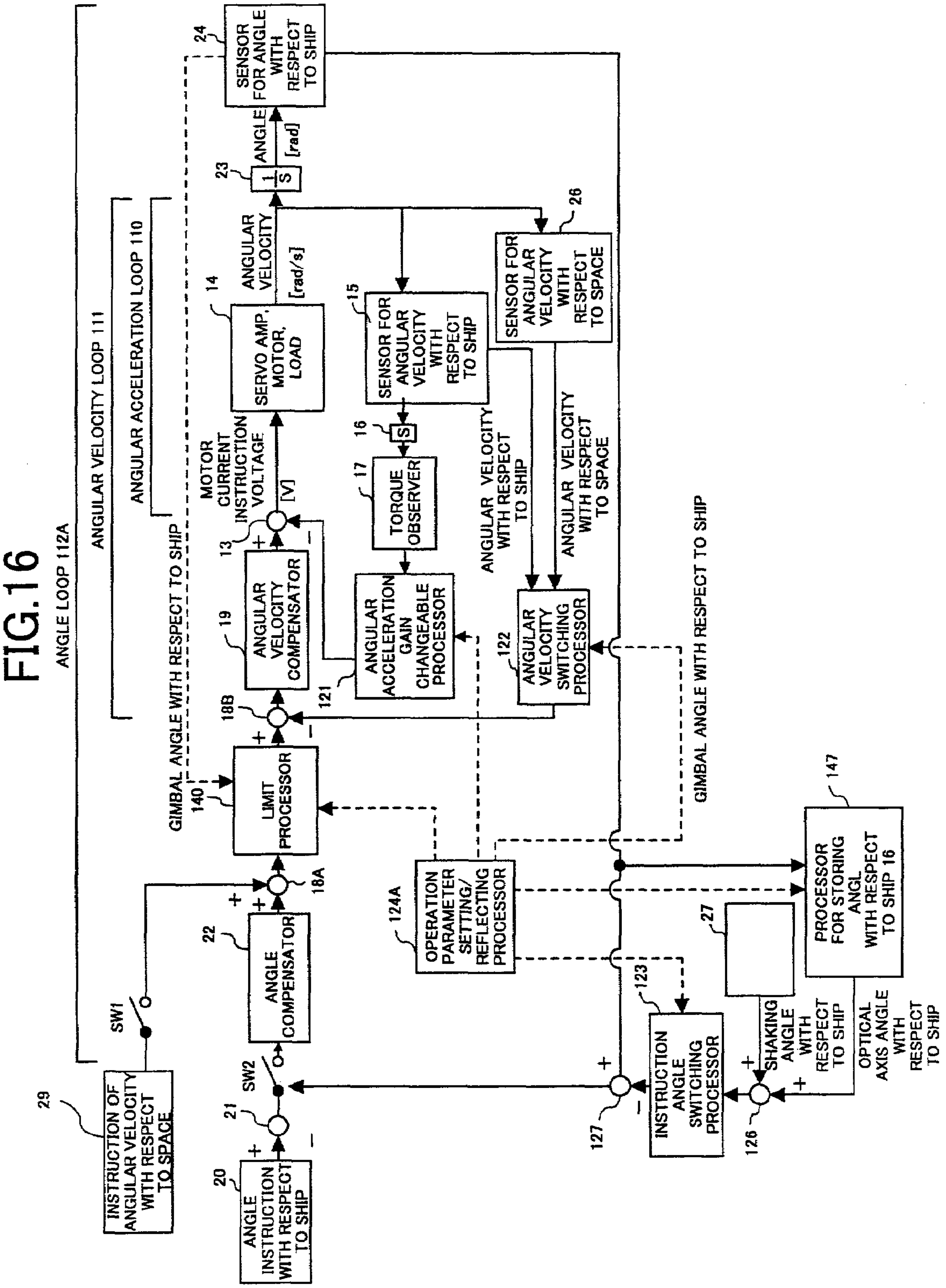
FIG. 16 is a block diagram showing an example of the present invention.

FIG. 16 shows an example of the present invention. In the figure, the same reference numbers are assigned to the same configuration elements described before.

FIG. 16 shows a configuration which includes both of the configurations of the first embodiment and the second embodiment. In the configuration shown in FIG. 16, a processor 147 of storing angle with respect to ship is added to the configuration shown in FIG. 13. The processor 147 for storing angle with respect to ship stores an optical axis angle with respect to ship according to the gimbal angle with respect to ship. The optical axis angle with respect to ship corresponds to an output signal of the integrator 125 shown in FIG. 13.

The function of the processor 147 for storing angle with respect to ship will be described in relation to the switches SW1 and SW2. When the mode is in the angular velocity control mode with respect to space M3, the switch SW2 which functions as an angle loop reflection switch is turned off, and the switch SW1 which functions as an external angular velocity signal reflection switch is turned on. Accordingly, the mode is changed to the angle control mode with respect to space M2. On the other hand, when the control mode M2 is changed to the control mode M3, an optical axis angle to space is stored in the processor 147 for storing angle with respect to ship, and the external angular velocity signal reflection switch SW1 is turned off and the angle loop reflection switch SW2 is turned on. Accordingly, by reducing the angle error to 0 at the time of switching, torque which is necessary for driving at the time of switching can be decreased. Thus, the gimbal can be switched smoothly without switching waiting time. For example, when the mode is switched to the angle control mode with respect to space M2 after the optical axis is directed to a direction, the mode can be switched instantaneously.

<Description of Operation Parameter Setting/Reflecting Processor 124A>

The operation parameter setting/reflecting processor 124A monitors a current instruction voltage to a servo amplifier, calculates reflection ratios to the angular velocity switching processor 122, the angular acceleration gain changeable processor 121 and the processor 123 for switching instruction angle with respect to ship and calculation results are output to the angular velocity switching processor 122, the angular acceleration gain changeable processor 121 and the processor 123 for switching instruction angle with respect to ship respectively so that change ratio of each processor is controlled. In addition, the processor 124A has a function to set parameters to the angle/angular velocity limiter processor 140, an angular acceleration gain changeable processor 121 and the processor 123 for switching instruction angle with respect to ship.

A function block diagram of the operation parameter setting/reflecting processor 124A is as shown in FIG. 12. FIG. 17 shows operation parameters and the signal outputs which are set and stored. As shown in FIG. 12, setting and reflection process of the operation parameters are performed in the memory part 132 and the computing part 131. The memory part 132 stores initial values for each operation parameter shown in FIG. 17 which is instructed to input by an external personal computer 136, and passes the parameters to the computing part 131 and to each processor. The computing part 131 includes three blocks of a computing part 133 of reflection ratio of instruction angle with respect to ship, a computing part 134 of angular acceleration gain reflection ratio and a computing part 135 of angular velocity reflection ratio. Then, the computing part 131 performs calculation on the basis of the stored operation parameters, a motor current instruction voltage and a monitor signal of the angle with respect to ship. Then, the computing part 135 outputs the reflection ratio to each corresponding switching processor so that switching states are controlled.

In the following, an example of the operation parameter settings shown in FIG. 17 will be described. The parameter of No. 1 is a limit value of the motor current instruction voltage, which is a voltage judgment parameter. In relation to this parameter, the computing part 131 of the operation parameter setting/reflection processing part 124A outputs signals of a target angle to ship reflection ratio, an angular acceleration gain reflection ratio, an angular velocity instruction correction value, and an angular velocity reflection ratio. The signals are output to the processor 123 for switching instruction angle with respect to ship, the angular acceleration gain changeable processor 121, the angle/angular velocity limiter processor 140 and the angular velocity switching processor 122.

In the following, the computing part 131 will be described in detail.

<Description of the Computing Part 133 of Reflection Ratio of Instruction Angle with Respect to Ship>

Figure 18:
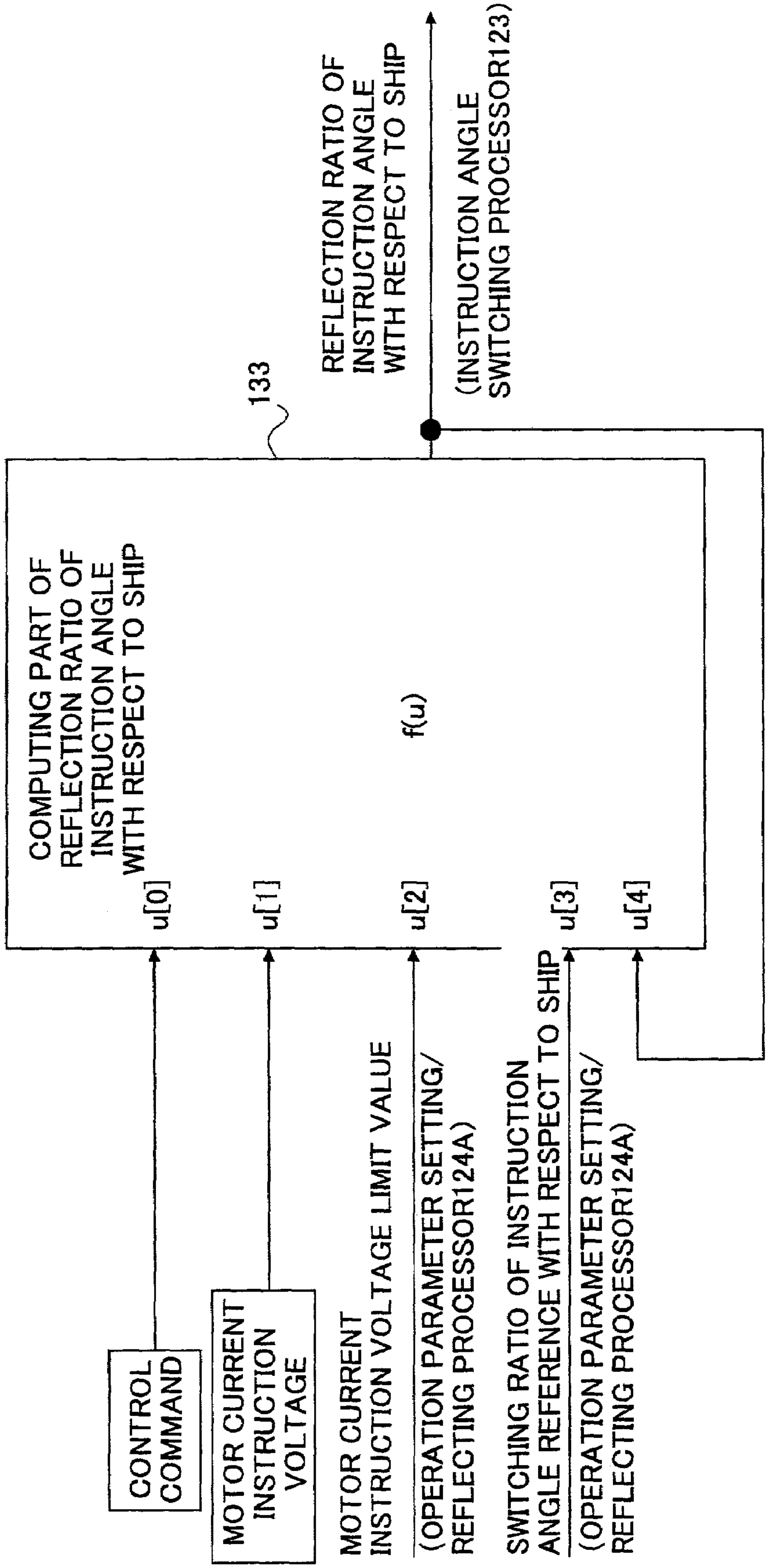
FIG. 18 shows a block diagram of a computing part of reflection ratio of instruction angle with respect to ship.

FIG. 18 shows a block diagram of the computing part 133 of reflection ratio of instruction angle with respect to ship. FIG. 19 shows a list of control mode switching conditions and equations for each condition.

The computing part 133 of reflection ratio of instruction angle with respect to ship receives input variables which are a control command (u[0]) from outside, a motor current instruction voltage (u[1]) and a motor current instruction limit value (u[2]) which is an operation parameter set in the memory part 132, a reference switching ratio of instruction angle with respect to ship (u[3]), a reflection ratio of instruction angle with respect to ship ([4]). Then, the computing part 133 calculates and outputs the reflection ratio of instruction angle with respect to ship f(u) according to conditional equations shown in FIG. 19.

When the angle control mode with respect to space M2 is changed to the angular velocity control mode with respect to space M3, or when the angular velocity control mode with respect to space M3 is changed to the angle control mode with respect to space M2, the reflection ratio of instruction angle with respect to ship becomes 1 (fixed) unconditionally. When performing switching of other control mode, the motor current instruction voltage (u[1]) and the motor current instruction limit value (u[2]) are compared. When an absolute value of the motor current instruction voltage (u[1]) exceeds the motor current instruction limit value (u[2]), changing of the reflection ratio is stopped and kept until torque is recovered. When an absolute value of the motor current instruction voltage (u[1]) does not exceed the motor current instruction limit value (u[2]), since there is a torque margin for the motor, the reference switching ratio of the instruction angle with respect to ship (u[3]) is added to or subtracted from an instruction angle reflection ratio with respect to ship ([4]) according to equations shown in FIG. 19.

Here, when the operation result is 0, it means that the reflection ratio is 0%. When the operation result is 1, it means that the reflection ratio is 100%. When the servo amplifier includes a motor applying current detection function, a detected current can be used instead of the motor current instruction voltage, and the motor current instruction limit value can be used as the motor current limit value.

<Description on the Computing Part 134 of Angular Acceleration Gain Reflection Ratio>

Figure 20:
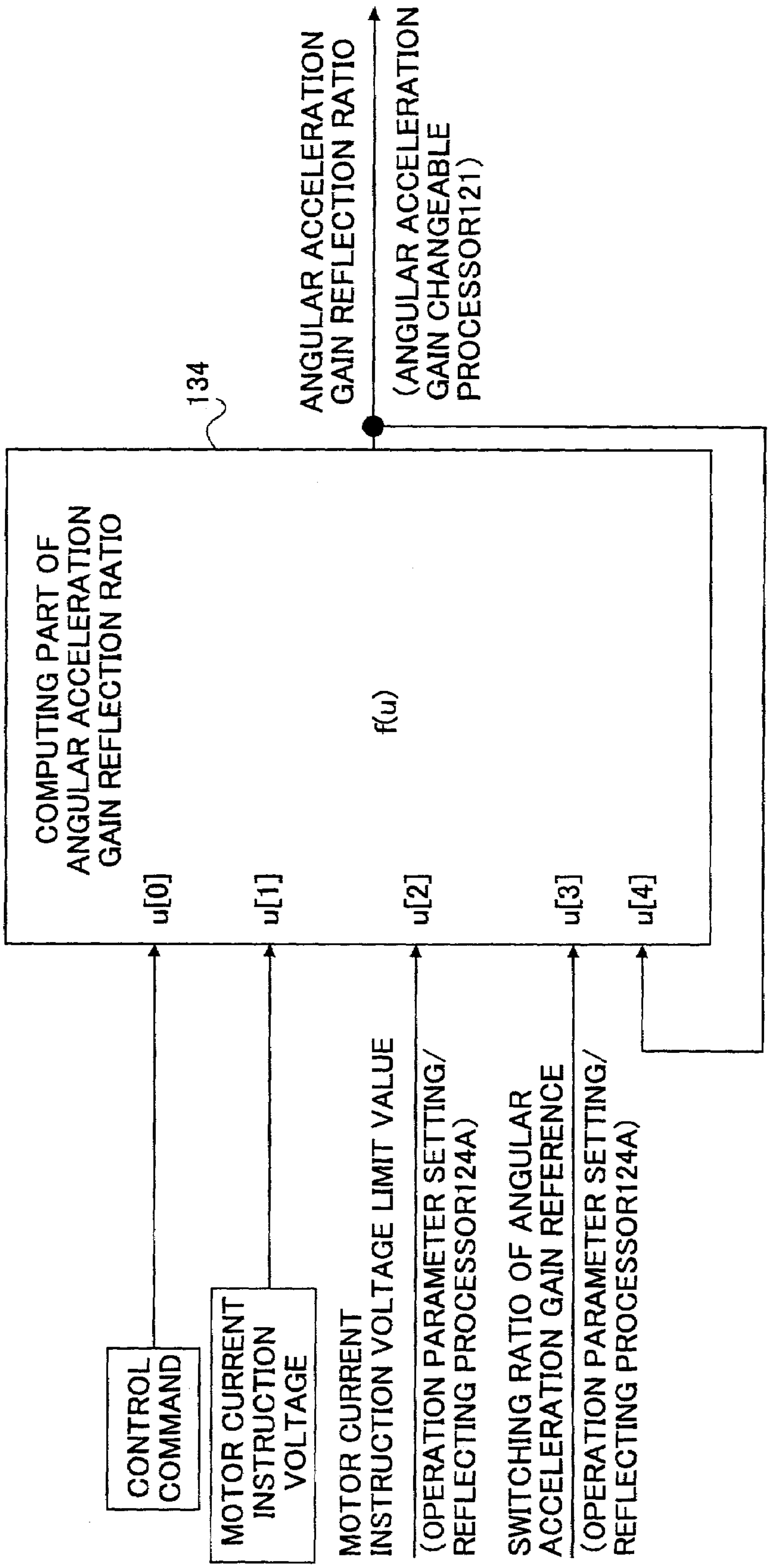
FIG. 20 shows a block diagram of a computing part of angular acceleration gain reflection ratio.

FIG. 20 shows a block diagram of the computing part 134 of angular acceleration gain reflection ratio. FIG. 21 shows a list of control mode switching conditions and the equations for each condition.

The computing part 134 of angular acceleration gain reflection ratio receives input variables which are a control command (u[0]) from outside, a motor current instruction voltage (u[1]) and a motor current instruction limit value (u[2]) which is an operation parameter set in the memory part 132, an angular acceleration gain reference switching ratio (u[3]), an angular acceleration gain reflection ratio ([4]). Then, the computing part 134 calculates and outputs the angular acceleration gain reflection ratio according to the conditions shown in FIG. 21.

When the angle control mode with respect to space M2 is changed to the angular velocity control mode with respect to space M3, or when the angular velocity control mode with respect to space M3 is changed to the angle control mode with respect to space M2, the instruction angle reflection ratio with respect to ship becomes 1 (fixed) unconditionally. In other switching patterns, the motor current instruction voltage (u[1]) and the motor current instruction limit value (u[2]) are compared. When an absolute value of the motor current instruction voltage (u[1]) exceeds the motor current instruction limit value (u[2]), changing of the reflection ratio is stopped and kept until torque is recovered.

When an absolute value of the motor current instruction voltage (u[1]) does not exceed the motor current instruction limit value (u[2]), since there is a torque margin for the motor, the angular acceleration gain reference switching ratio (u[3]) is added to or subtracted from the angular acceleration gain reflection ratio ([4]) according to the equation in the table.

Here, when the operation result is 0, it means that the reflection ratio is 0%. When the operation result is 1, it means that the reflection ratio is 100%. When the servo amplifier includes a motor applying current detection function, a detected current can be used instead of the motor current instruction voltage, and the motor current instruction limit value can be used as the motor current limit value.

<Description on the Computing Part 135 of Angular Velocity Reflection Ratio>

Figure 22:
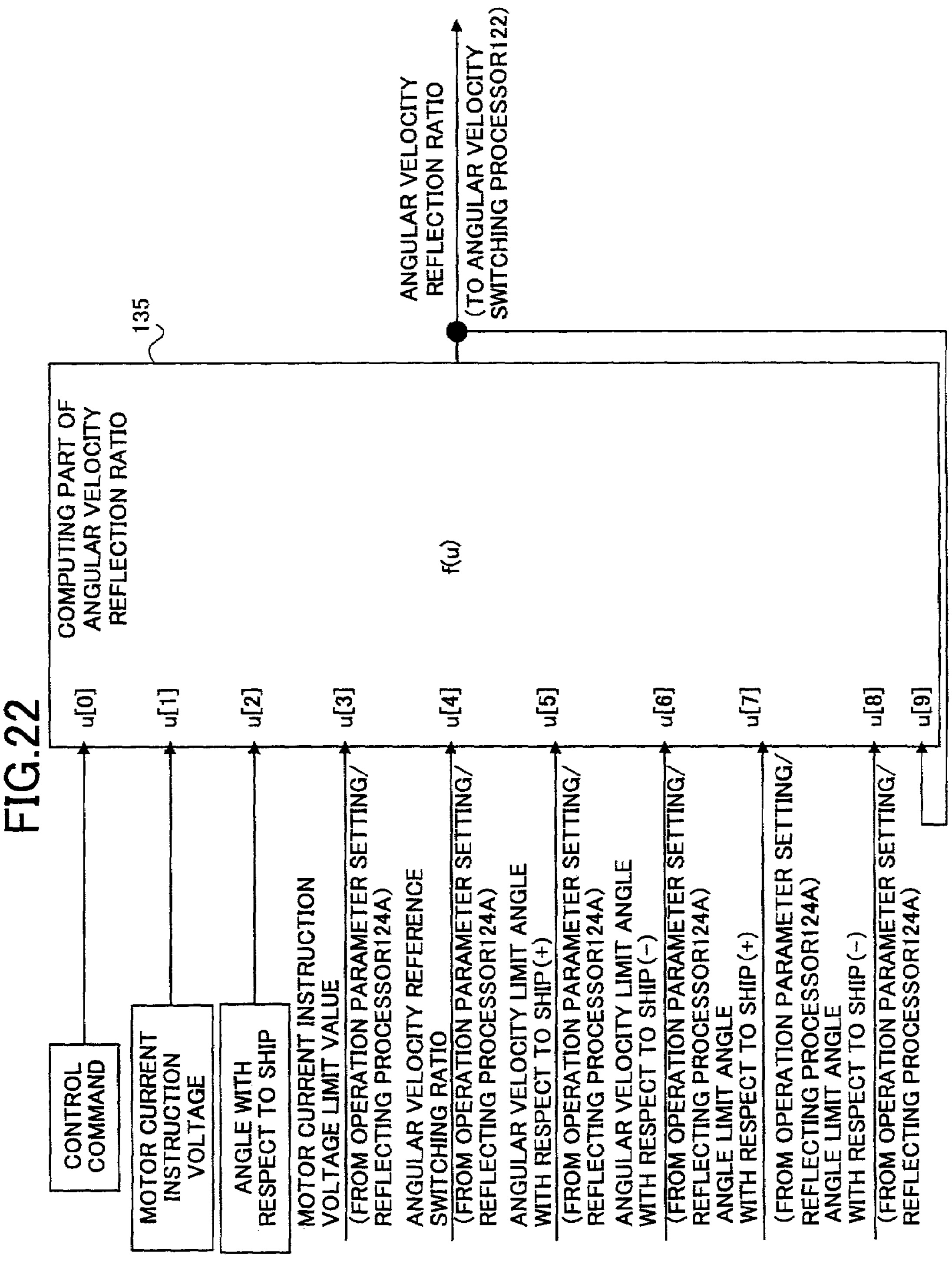
FIG. 22 shows a block diagram of a computing part of angular velocity reflection ratio shown in FIG. 12.

FIG. 22 shows a block diagram of the computing part 135 of angular velocity reflection ratio. FIG. 23A shows control mode switching conditions and the equations for each condition. FIG. 23B shows reflection conditions and equations for each condition for each driving region.

The computing part 135 of angular velocity reflection ratio receives input variables which are a control command (u[0]) from outside, a motor current instruction voltage (u[1]), an angle with respect to ship (u[2]) from a sensor of angle with respect to ship, a motor current instruction limit value (u[3]) which is an operation parameter set in the memory part, an angular acceleration reference switching ratio (u[4]), an angular velocity limit angle with respect to ship (+) (u[5]), an angular velocity limit angle with respect to ship (−) (u[6]), an angle limit angle with respect to ship (+) (u[7]), an angle limit angle with respect to ship (−) (u[8]) and an angular velocity reflecting ratio (u[9]). Then, the computing part 135 calculates and outputs the angular acceleration reflection ratio according to the equations shown in FIGS. 23A and 23B.

When the control modes are switched, conditions and equations in FIG. 23A are used. When the angle control mode with respect to space M2 is changed to the angular velocity control mode with respect to space M3, or when the angular velocity control mode with respect to space M3 is changed to the angle control mode with respect to space M2, the angular velocity reflection ratio becomes 1 (fixed) unconditionally, which means that the angular velocity with respect to space is reflected 100%.

In other switching patterns, the motor current instruction voltage (u[1]) and the motor current instruction limit value (u[3]) are compared. When an absolute value of the motor current instruction voltage (u[1]) exceeds the motor current instruction limit value (u[3]), changing of the reflection ratio is stopped and kept until torque is recovered.

When an absolute value of the motor current instruction voltage (u[1]) does not exceed the motor current instruction limit value (u[3]), since there is a torque margin for the motor, the angular acceleration reference switching ratio (u[4]) is added to or subtracted from the angular acceleration reflection ratio ([9]) according to the equations in FIGS. 23A and 23B.

Here, when the operation result is 0, it means that the reflection ratio is 0%. When the operation result is 1, it means that the reflection ratio is 100%. When the servo amplifier includes a motor applying current detection function, a detected current can be used instead of the motor current instruction voltage, and the motor current instruction limit value can be used as the motor current limit value.

When the gimbal mecha-limit exists, reflection conditions and equations for each condition when driving region is limited shown in FIG. 23B are reflected.

In the angle control mode with respect to ship M1, the angular velocity reflection ratio becomes 0 (fixed) unconditionally, that is, the angular velocity with respect to ship is reflected 100%.

In the angle control mode with respect to space M2 and the angular velocity control mode with respect to space M3, the reflection ratio is calculated and output according to equations shown in FIG. 23B. In the calculation, it is judged whether the gimbal angle is within the angular velocity reflection region with respect to space, within the angular velocity reflection region with respect to ship or within mixed reflection region in which the angular velocity reflection region with respect to space and the angular velocity reflection region with respect to ship are mixed. In the angular velocity reflection region with respect to space, 100% of a value of the sensor of angular velocity with respect to space is calculated and output. In the angular velocity reflection region with respect to ship, 100% of a value of the sensor of angular velocity with respect to ship is calculated and output. In the mixed reflection region, the reflection ratio is calculated and output, and output values of the angular velocity sensor 26 with respect to space and the angular velocity sensor 15 with respect to ship are mixed and controlled.

Here, when the operation result is 0, it means that the reflection ratio is 0%. When the operation result is 1, it means that the reflection ratio is 100%. When the servo amplifier includes a motor applying current detection function, a detected current can be used instead of the motor current instruction voltage, and the motor current instruction limit value can be used as the motor current limit value.

<Description of the Angular Acceleration Gain Changeable Processor 121>

The angular acceleration gain changeable processor 121 is provided in the angular acceleration loop 110, and the feedback loop gains at the time of boot-up/stop are calculated and output on the basis of the reflection ratio of the operation parameter setting/reflection processor 124A.

Figure 24:
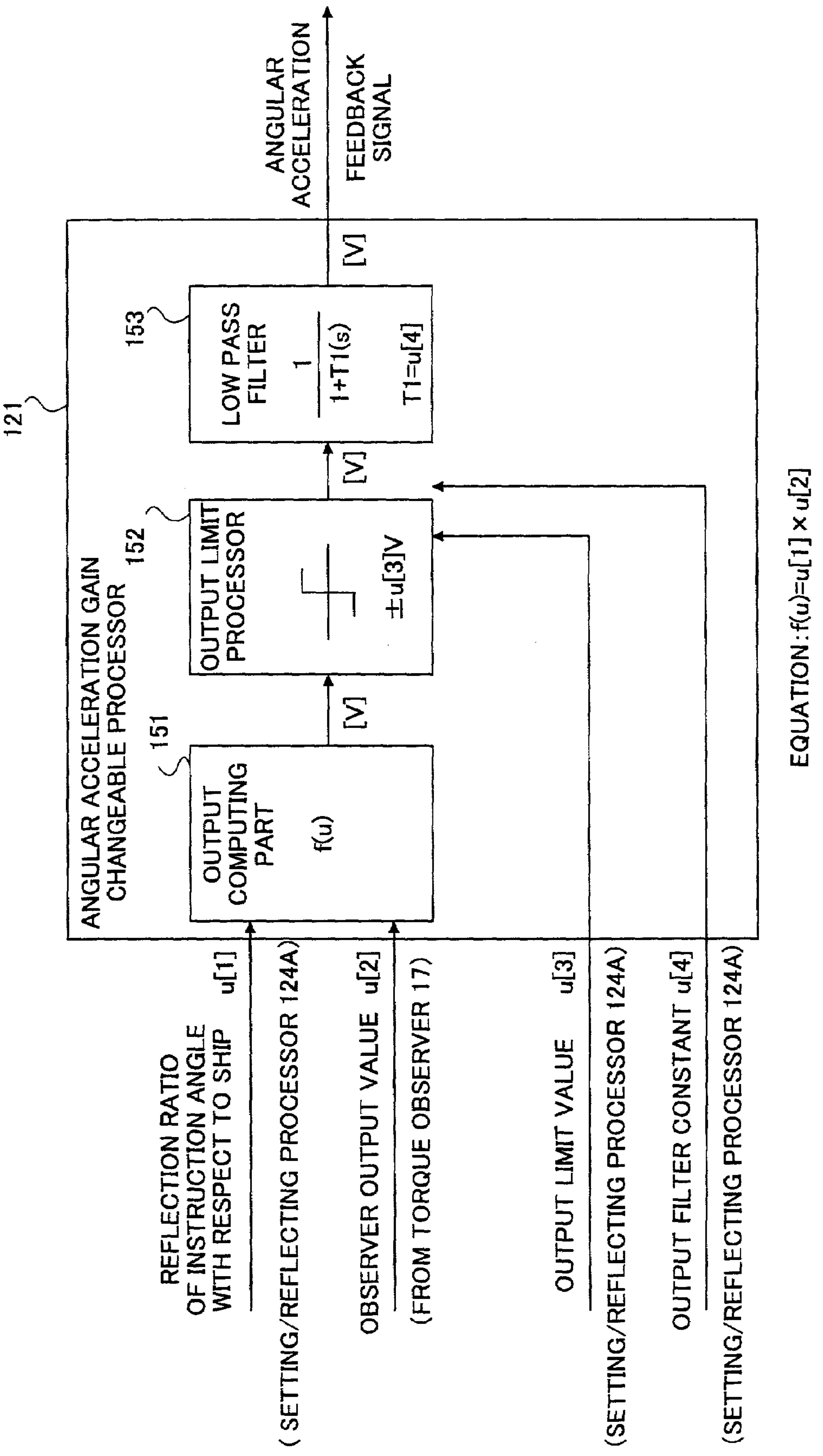
FIG. 24 shows a function block diagram and an equation of the angular acceleration gain changeable processor shown in FIG. 12.

FIG. 24 shows a function block diagram and an equation of the angular acceleration gain changeable processor 121. The angular acceleration gain changeable processor 121 includes an output computing part 151, an output limit processor 152 and a low pass filter 153.

The reflection ratio is calculated according to the equation f(u)=u[1]+u[2] in the output computing part 151 in which u[1] is the reflection-ratio from the operation parameter setting/reflecting processor 124A and u[2] is the feedback output value from the torque observer 17. In addition, by using an angular acceleration output limiter setting value (u[3]), the output value calculated by the output computing part 151 is limited. In addition, by the low pass filter using an output filter constant (u[4]) input from the operation parameter setting/reflecting processor 124A, high frequency noise component which the gimbal can not track and effects of mechanical resonance and electrical noise are removed, so that an angular acceleration feedback signal is output.

<Description of the Angular Acceleration Processor 122>

The angular acceleration processor 122 is provided in the angular velocity loop 110. The angular acceleration processor 122 calculates and outputs reflection angular velocity at the time of mode switching and in the vicinity of mechanical operating limit point.

Figure 25:
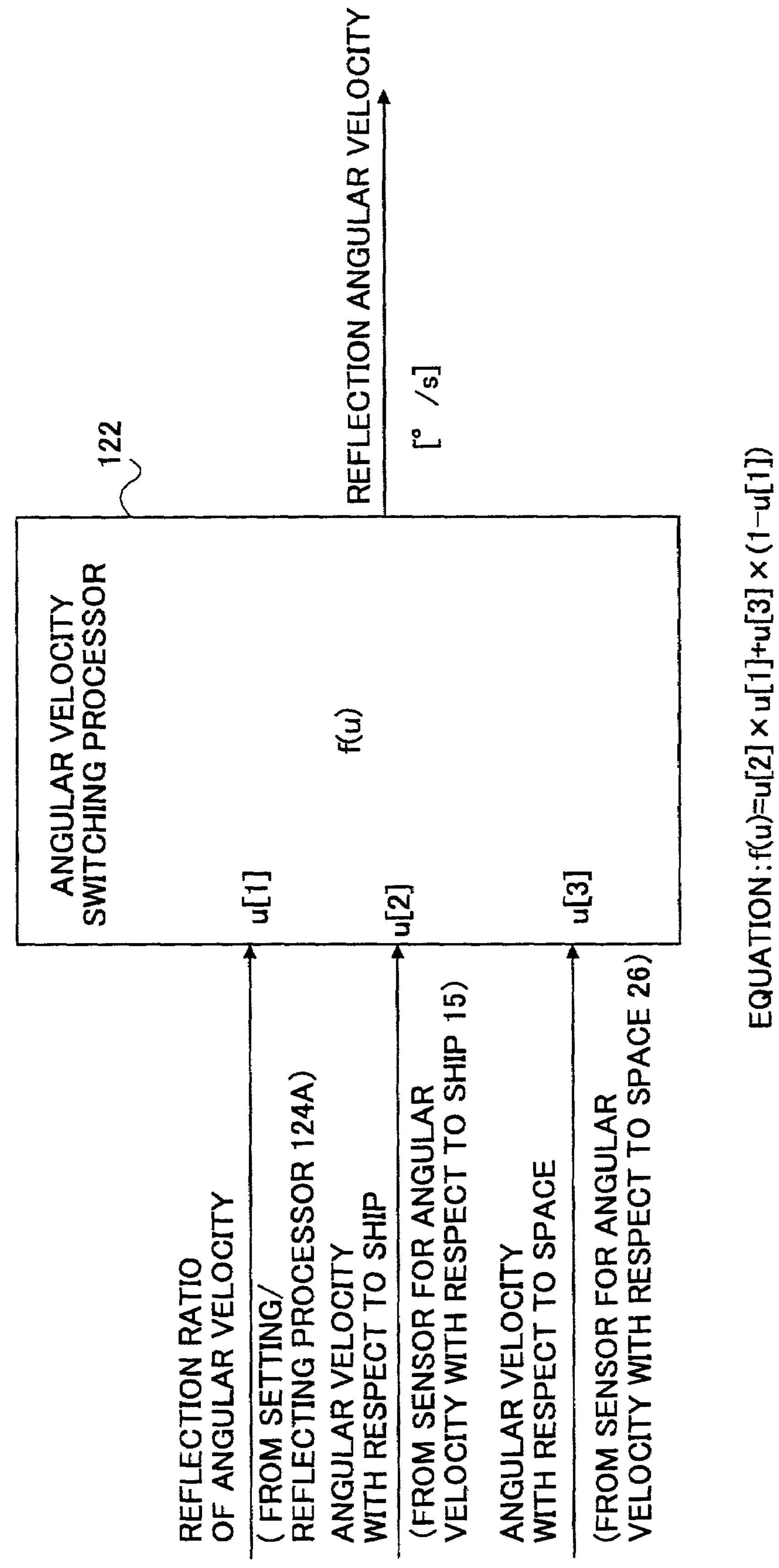
FIG. 25 shows a function block diagram and an equation of the angular acceleration processor 122.
Figure 26:
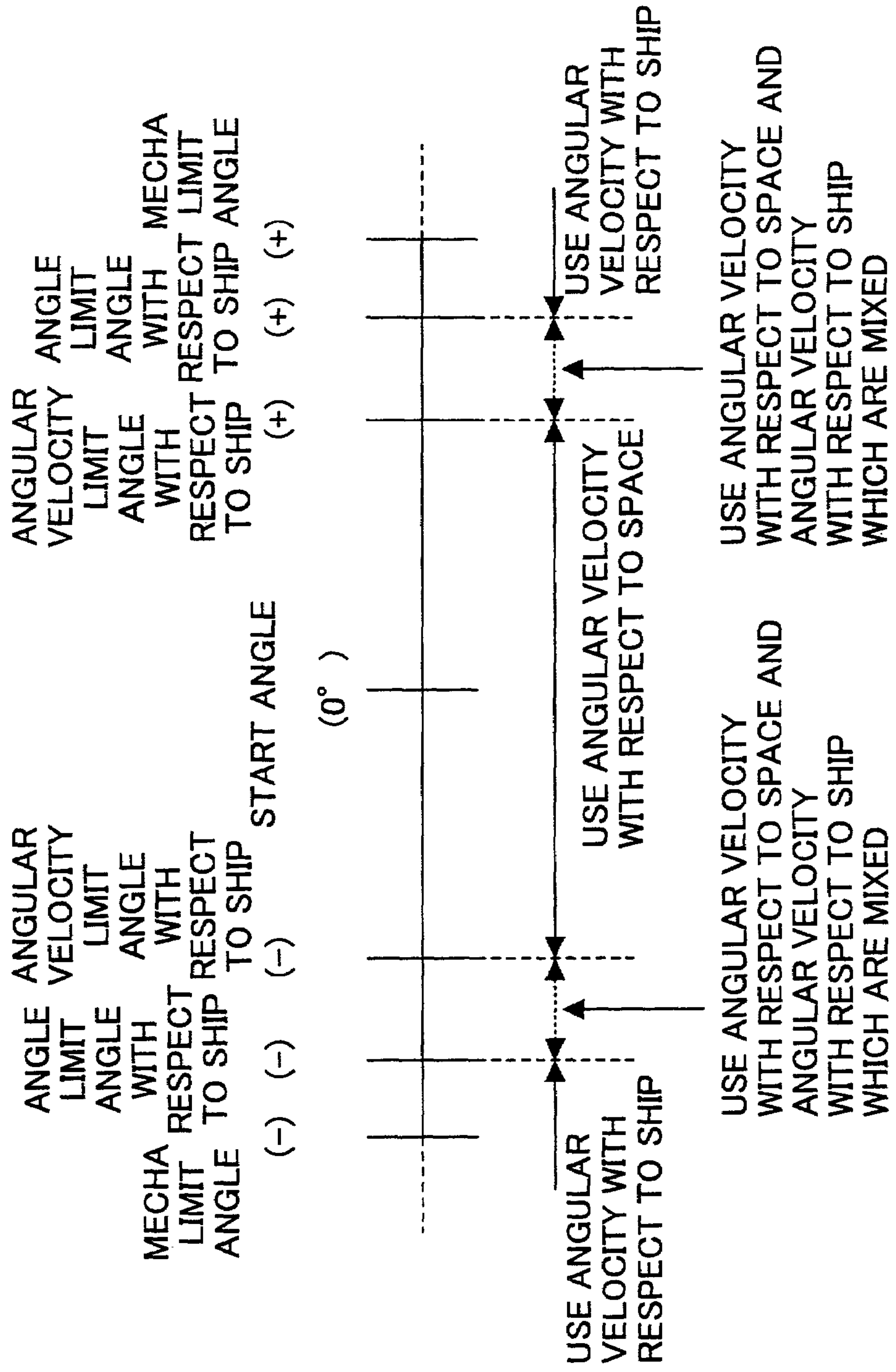
FIG. 26 is a figure for explaining an example of angular velocity reflection.

FIG. 25 shows a function block diagram and an equation of the angular acceleration processor 122, and FIG. 26 is a figure for explaining angular velocity reflection.

The angular acceleration switching processor 122 receives an angular velocity reflection ratio output from the operation parameter setting/reflecting processor 124 and two detected signals of the angular velocity with respect to ship and the angular velocity with respect to space, and the angular acceleration processor 122 calculates and outputs the reflection angular velocity according to the equation f(u)=u[2]×u[1]+u[3])×(1−(u[1]).

The angular acceleration switching processor 122 includes a function of smoothly switching between three control modes M1-M3, and a function of smooth stop/retracking in the vicinity of gimbal mecha-limit.

As shown in FIG. 26, in the angle control mode with respect to space M2 and in the angular velocity control mode with respect to space M3, when the gimbal angle with respect to ship is within from the angular velocity limit angle with respect to ship (+) to the angular velocity limit angle with respect to ship (−), the angular velocity switching processor 122 uses a signal in which the angular velocity with respect to space is reflected 100%.

When the gimbal angle to ship is equal to or more than the angle limit angle with respect to ship (+) or equal to and smaller than the angle limit angle with respect to ship (−), the angular velocity switching processor 122 outputs a signal in which 100% of angular velocity with respect to ship is reflected.

When the gimbal angle with respect to ship is within a range from the angular velocity limit angle with respect to ship (+) to the angle limit angle with respect to ship (+), or within a range from the angle limit angle with respect to ship (−) to the angular velocity limit angle with respect to ship (−), signals of the angular velocity with respect to space and the angular velocity with respect to ship are mixed and output.

<Explanation of the Angle/Angular Velocity Limit Processor 140>

The angle/angular velocity limit processor 140 is provided in the angle loop 112A, and outputs an angular velocity instruction output value by using an operation parameter from the operation parameter setting/reflecting processor 124A, an instruction angular velocity and the gimbal angle with respect to ship.

Figure 27:
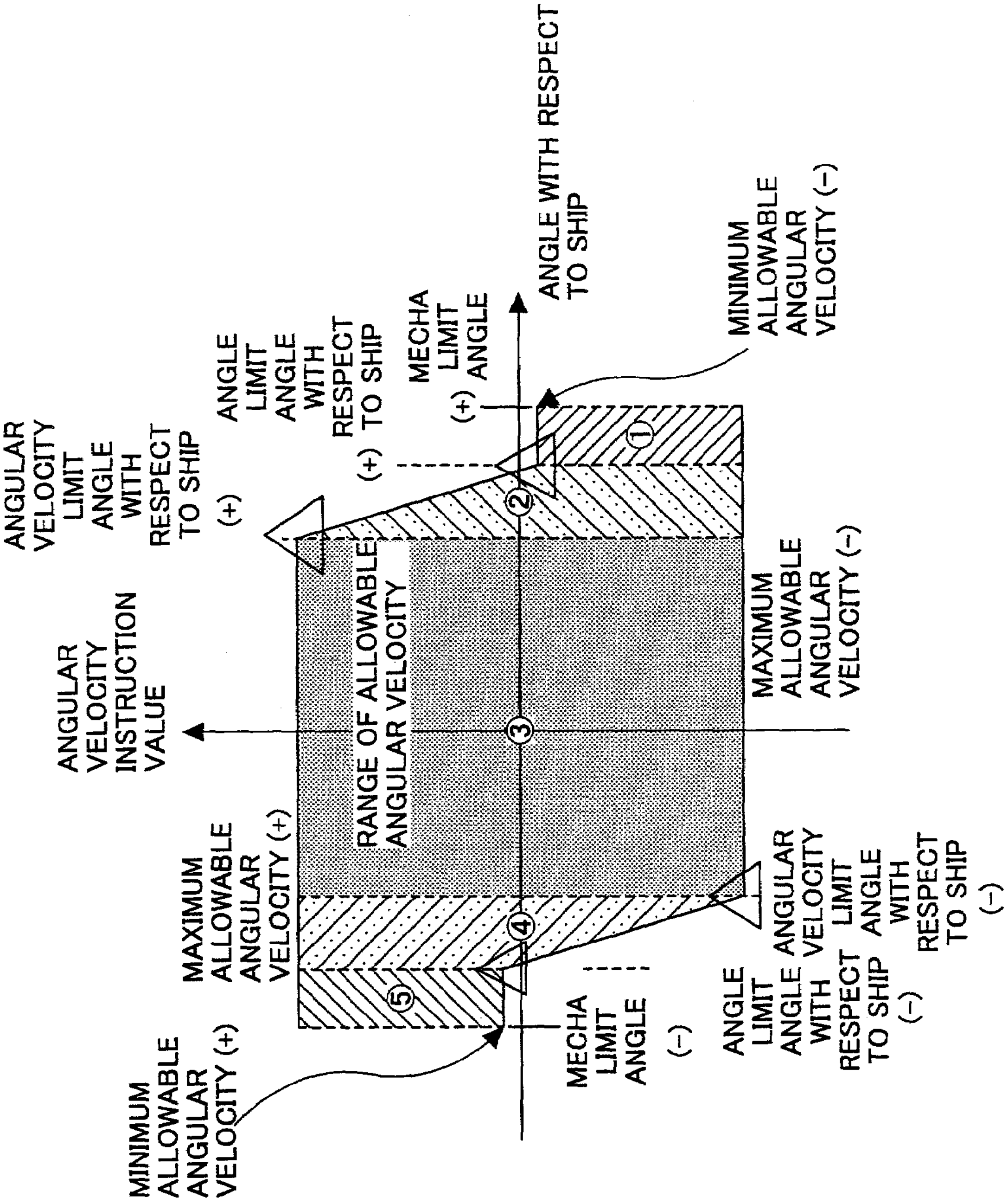
FIG. 27 shows calculation example of the angle/angular velocity limit computing part shown in FIG. 14.

An configuration example of the angle/angular velocity limit processor 140 is shown in FIG. 14. FIG. 27 shows calculation example of the angle/angular velocity limit computing part 141 shown in FIG. 14.

The angle/angular velocity limit processor 140 limits the angle with respect to ship such that angular velocity instruction values become within regions ①-⑤ shown in FIG. 27 which are formed by eight operation parameters set in the operation parameter setting/reflection processor which are a maximum allowable angular velocity (+), a maximum allowable angular velocity (−), a minimum allowable angular velocity (+), a minimum allowable angular velocity (−), an angle limit angle with respect to ship (+), an angle limit angle with respect to ship (−), an angular velocity limit angle with respect to ship (+) and an angular velocity limit angle with respect to ship (−).

The angle/angular velocity limit processor 140 includes the angle/angular velocity limit computing part 141 and the angular velocity instruction output filter 142, in which operation parameters from the operation parameter setting/reflecting processor 124A are reflected.

An instruction angular velocity signal (u[2]) and the angle with respect to ship (u[1]) are input to the angle/angular velocity limit computing part 141. Then, the angle/angular velocity limit computing part 141 reflects and calculates the instruction angular velocity signal such that the signals are limited by the regions shown in FIG. 27 on the basis of the eight parameters (a maximum allowable angular velocity (+), a maximum allowable angular velocity (−), a minimum allowable angular velocity (+) a minimum allowable angular velocity (−), an angle limit angle with respect to ship (+), an angle limit angle with respect to ship (−), an angular velocity limit angle with respect to ship (+) and an angular velocity limit angle with respect to ship (−). Then, the signals are passed through the angular velocity instruction output filter 142 which uses the angular velocity output constant from the operation parameter setting/reflecting processor 124A, so that corrected angular velocity instruction value is output.

In the state shown in FIG. 27, in the computing part 141, since the angle instruction value of stop/recovery shown by triangles in the figure becomes ramp-like waveform, angular acceleration occurs and necessary torque increases momentarily.

Figure 28:
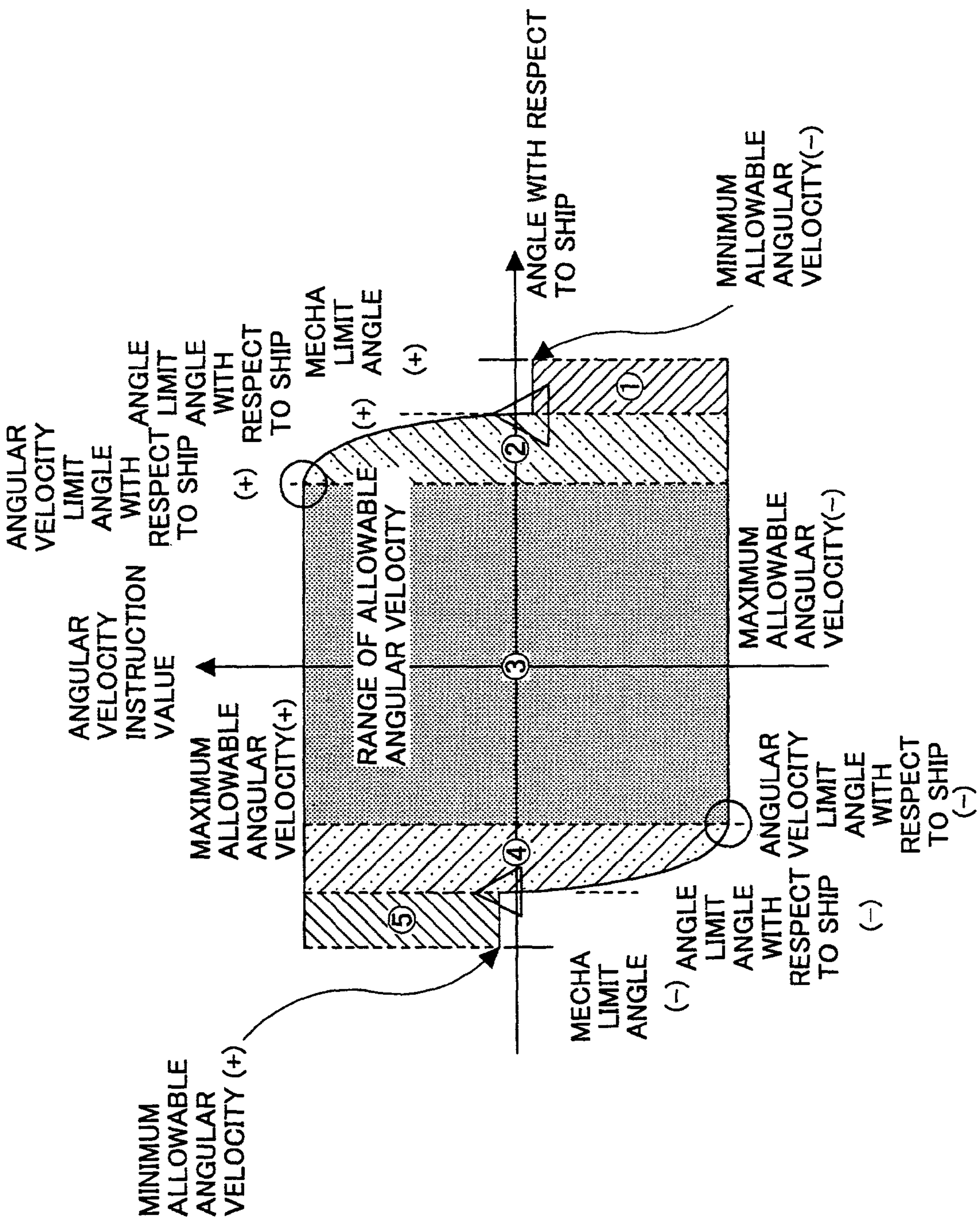
FIG. 28 shows another calculation example of the angle/angular velocity limit computing part shown in FIG. 14.

When the computing part 141 performs calculation like the waveform shown in FIG. 28, stop operation at the angular velocity limit point with respect to ship shown by circles becomes smooth so that necessary torque is suppressed. However, in the recovery points shown by triangles in the figure, since the angle instruction value becomes ramp-like waveform, angular acceleration occurs and necessary torque increases momentarily.

Figure 29:
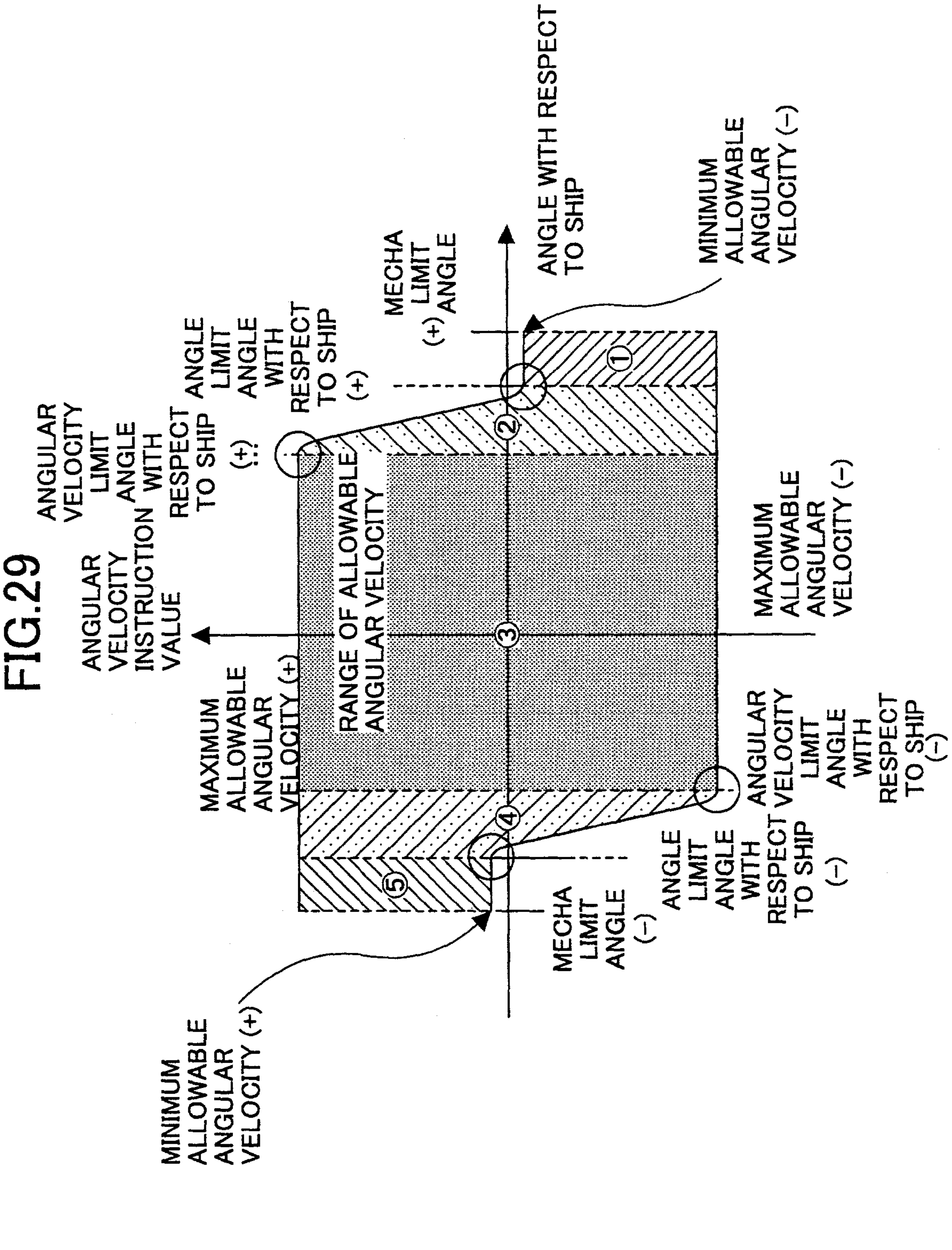
FIG. 29 shows still another calculation example of the angle/angular velocity limit computing part shown in FIG. 14.

When the computing part 141 performs calculation shown in FIG. 29, the angle instruction value becomes smooth in both points of the stop operation at the angular velocity limit point with respect to ship and the recovery operation at the angle limit angle with respect to ship. Thus, the necessary torque is suppressed and the operation becomes smooth.

<Explanation of the Processor 123 for Switching Instruction Angle with Respect to Ship>

The processor 123 for switching instruction angle with respect to ship is provided in the angle loop 112A, and calculates the instruction angle with respect to ship in the computing part 144 shown in FIG. 15 on the basis of the instruction angle reflection ratio with respect to ship and the instruction angle with respect to ship which are instructed by the operation parameter setting/reflecting processor 124A.

In the angle control mode with respect to ship M1, the instruction angle reflection ratio with respect to ship from the operation parameter setting/reflecting processor 124A becomes 0 (output of instruction angle with respect to ship is also 0), and only the gimbal angle signal with respect to ship is fed back.

When switching to the angle control mode with respect to ship M1, the angle control mode with respect to space M2 and the angular velocity control mode with respect to space M3, the instruction angle reflection ratio with respect to ship from the operation parameter setting/reflecting processor 124A changes within a range from 0 to 1. In the angle control mode with respect to space M2 and the angular velocity control mode with respect to space M3, the instruction angle reflection ratio with respect to ship from the operation parameter setting/reflecting processor 124A is fixed to be 1, that is, the space instruction angle with respect to ship is 100%. In the angle control mode with respect to space M2 and the angular velocity control mode with respect to space M3, the output limiter 145 in the processor 123 restricts output by the angle limit angle with respect to ship (+) and the angle limit angle with respect to ship (−) from the operation parameter setting/reflecting processor 124A such that the optical axis does not deviate from the horizon and the optical axis does not exceed the gimbal mecha-limit angle.

The equation of the computing part 144 shown in FIG. 15 is f(u)=u[1]×u[2]. The instruction angle with respect to ship is calculated according to this equation on the basis of the instruction angle reflection ratio with respect to ship u[1] and the space instruction angle with respect to ship u[2] which are instructed by the operation parameter setting/reflecting processor 124A. Then, the target angle with respect to ship output value is restricted such that it does not exceed the mechanical limit angle by using the angle limit angle with respect to ship (+) (u[3]) and the angle limit angle with respect to ship (−) (u[4]) which are set by the operation parameter setting/reflecting processor 124A.

<Explanation of Switching between the Angle Control with Respect to Space and the Angular Velocity Control with Respect to Space>

When the mode is switched to the angular velocity control mode with respect to space M3 by an external angular velocity instruction with respect to ship (for example, by using a joystick) in which the optical axis is directed to an arbitrary direction with respect to space, an angle loop reflection switch SW2, an external angular velocity instruction with respect to space, an external angular velocity reflection switch with respect to space SW1 and a processor 147 for storing angle with respect to ship are used. The operation parameter setting/reflecting processor 124A monitors the control command, and when the command of switching to the angle control mode with respect to space M2 is input, SW2 is turned off so that angle control is separated and the mode is switched to the control mode M2. Then, SW1 is turned on and the angular velocity instruction with respect to ship is connected and reflected.

<Explanation of Processor 147 for Storing Angle with Respect to Ship>

When the angular velocity control mode with respect to space M3 is switched to the angle control mode with respect to space M2 or to the angle control mode with respect to ship M1, the external angular velocity reflection switch with respect to space SW1 is turned off, and an optical axis angle with respect to ship which is calculated by a computing part in the processor 147 is stored in the inside memory instantaneously, and the stored angle is reflected as the optical axis angle with respect to ship, and the switch SW2 is turned on.

Figure 30:
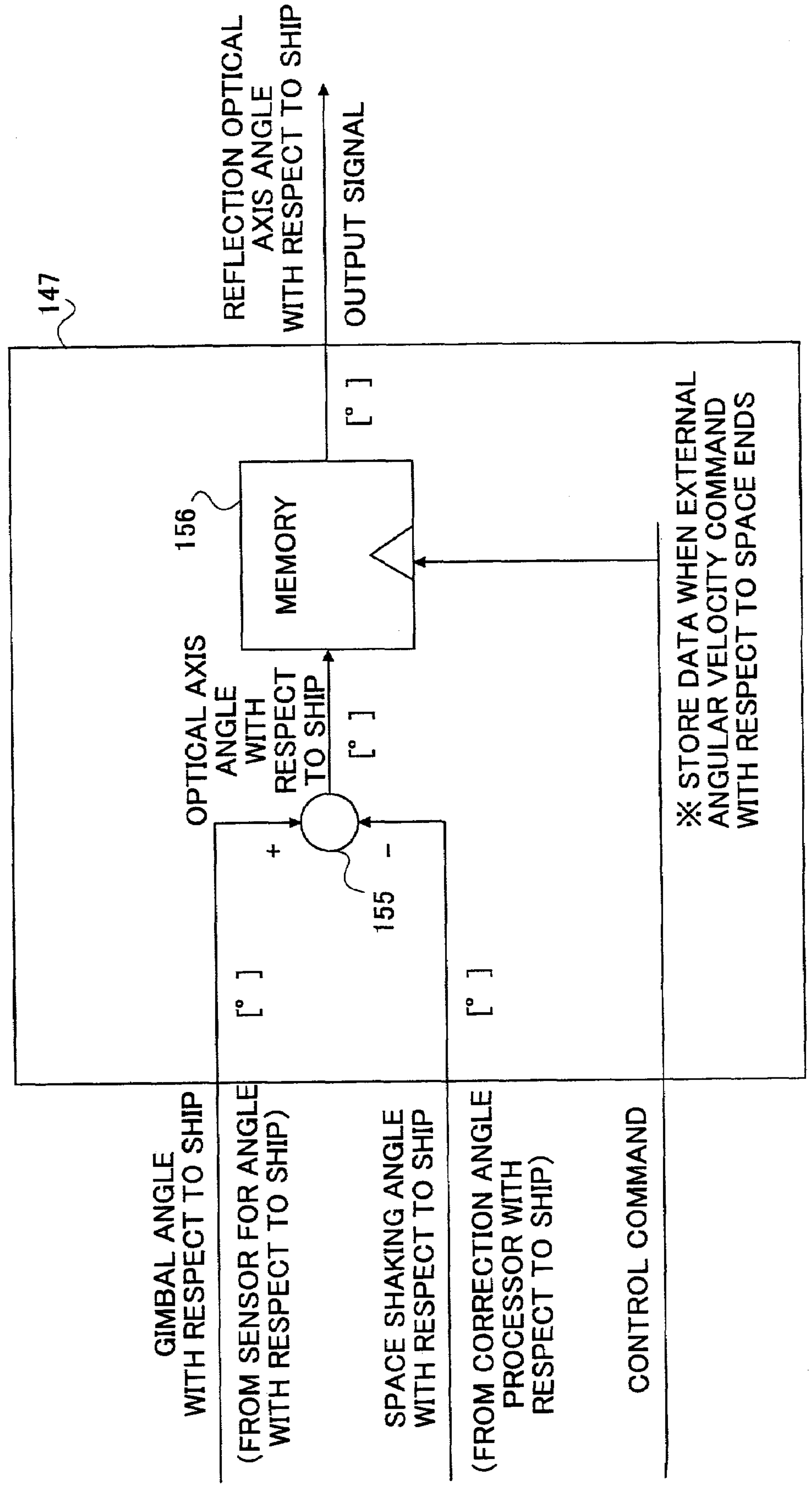
FIG. 30 shows a block diagram of the processor for storing angle with respect to ship.

FIG. 30 shows a block diagram of the processor 147 for storing angle with respect to ship. The optical axis with respect to ship is calculated by subtracting the space shaking angle with respect to ship obtained from the processor of correction angle with respect to ship from the gimbal angle with respect to ship obtained from the sensor 24 of angle with respect to ship by the subtracter 155. Then, the optical axis angle with respect to ship is stored in a memory 156 when the control command is switched from the angular velocity control mode.

According to the first and second embodiments 1 and the example, following effects are obtained.

By providing an angular velocity switching processor 122, an angular acceleration gain changeable processor 121 and the processor 123 for switching instruction angle with respect to ship, and by switching the reflection signal, control mode switching from the control instruction command can be realized.

According to the operation parameter setting/reflecting processor 124, 124A, reflection ratios in each of the switching processors 121-123 can be controlled such that the motor current instruction voltage does not exceed a setting value when switching between the angle control mode with respect to ship M1 and the angle control mode with respect to space M2. In addition, by setting/storing/externally reflecting the operation parameters, this invention can be adaptable to other driving systems having different specifications.

By providing the angular velocity switching processor 122, the reflection ratio of the reflection gain of the angular acceleration feedback loop 110 can be reflected smoothly. Thus, starting torque which occurs when switching can be suppressed.

By providing the processor 123 for switching instruction angle with respect to ship, switching of the instruction angle with respect to ship can be reflected smoothly so that stable switching operation can be realized.

In addition, a small motor which can not respond to sudden response in which torque is small can be used. In addition, in a disturbance condition, for example, in a shaking condition after the ship left port, bad weather of strong wind and rain, low temperature condition, vibration in high speed navigation, the optical axis of the camera mounted in the gimbal is stabilized with respect to space smoothly and positioned accurately.

Figure 31:
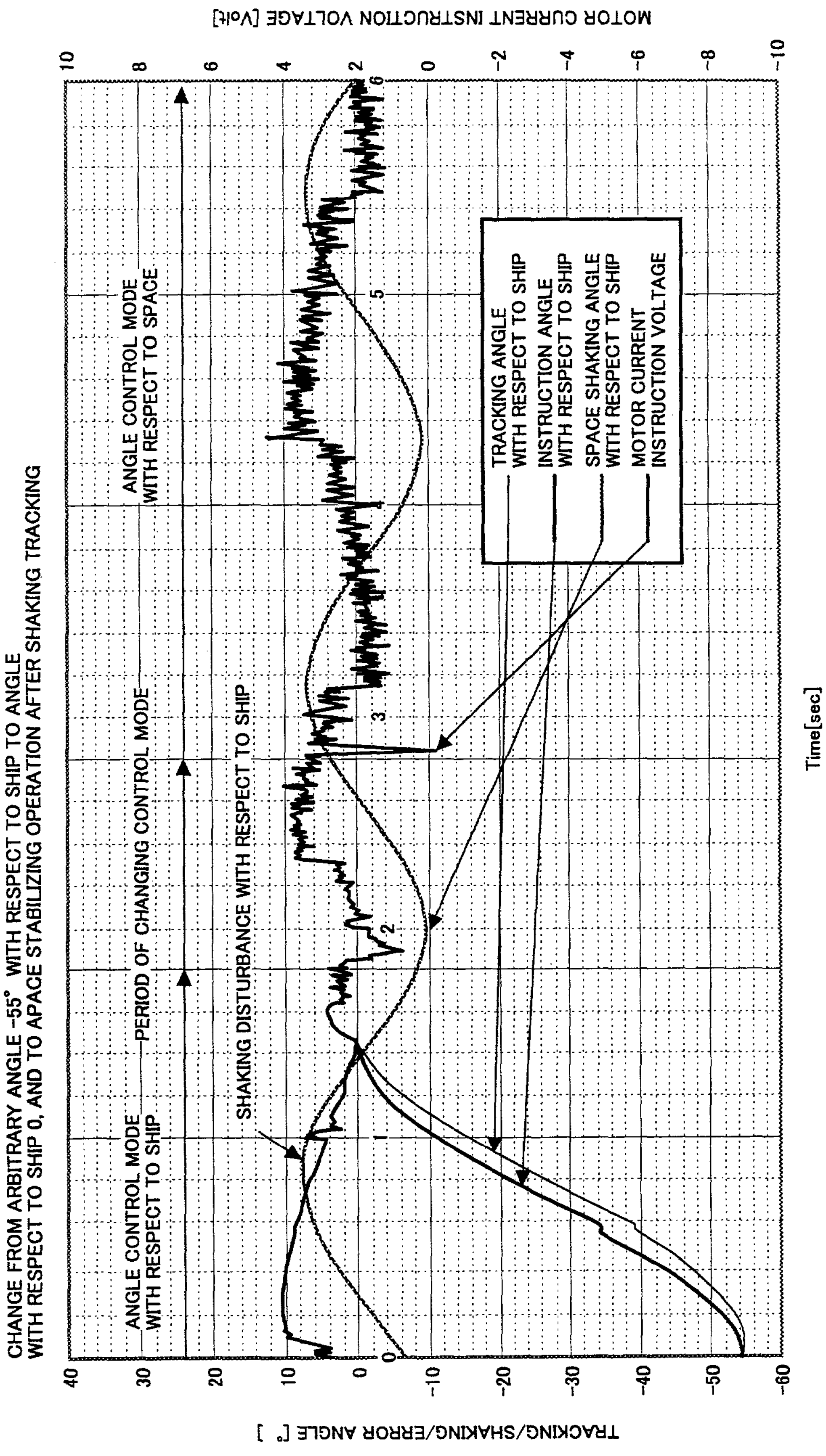
FIG. 31 shows an example of a simulation in which the angle control mode with respect to space M2 is switched to the angular velocity control mode with respect to space M3 according to the present invention.

FIG. 31 shows an example of a simulation in which the angle control mode with respect to space M2 is switched to the angular velocity control mode with respect to space M3 according to the present invention. The lateral axis indicates elapsed time [second], the left horizontal axis indicates instruction angle with respect to ship, gimbal tracking angle, ship shaking angle [°]. The right horizontal axis indicates a motor current instruction voltage [Volt]. In the figure, simulation results (instruction angle with respect to ship, gimbal tracking angle, ship shaking angle plotted, motor current instruction voltage) are plotted. The motor current instruction voltage is a scale factor in which rated torque is output in ±10V.

In the angular velocity control mode with respect to ship region (from 0 to 1.8 second), the gimbal is tracking-controlled from the housing position (−55° in this example) to the reference angle with respect to ship 0° by the angle instruction with respect to ship. When the external control command is switched to the angle control mode with respect to space (1.8 second), the mode is changed to the angle control mode with respect to space after 1 second control mode change period.

When the mode is changed to the angle control mode with respect to space (1.8 second), it can be understood from this figure that there is no change in the motor current instruction voltage and the gimbal operates stably.

In addition, according to the second embodiment and example of the present invention, the angular velocity switching processor 122, the angle/angular velocity limit processor 140 provided in the angle loop 112A and processor 123 for switching instruction angle with respect to ship are provided. By switching the reflection signal, collision avoidance in the vicinity of the gimbal mecha-limit angle can be realized and driving torque can be suppressed. Thus, smooth tracking operation can be performed.

In addition, by the operation parameter setting/reflecting processor 124A, operation parameters for collision avoidance in the vicinity of the gimbal mecha-limit angle are set/stored/externally reflected, and reflection ratios of the angular velocity switching processor 122, the angle/angular velocity limit processor 140 and the processor 123 for switching instruction angle with respect to ship can be controlled.

By the angular velocity switching processor 122, switching ratio of the angular velocity with respect to ship and the angular velocity with respect to space can be reflected smoothly.

By the angle/angular velocity limit processor 140, the instruction angular velocity for the gimbal angle with respect to ship can be restricted.

Figure 32:
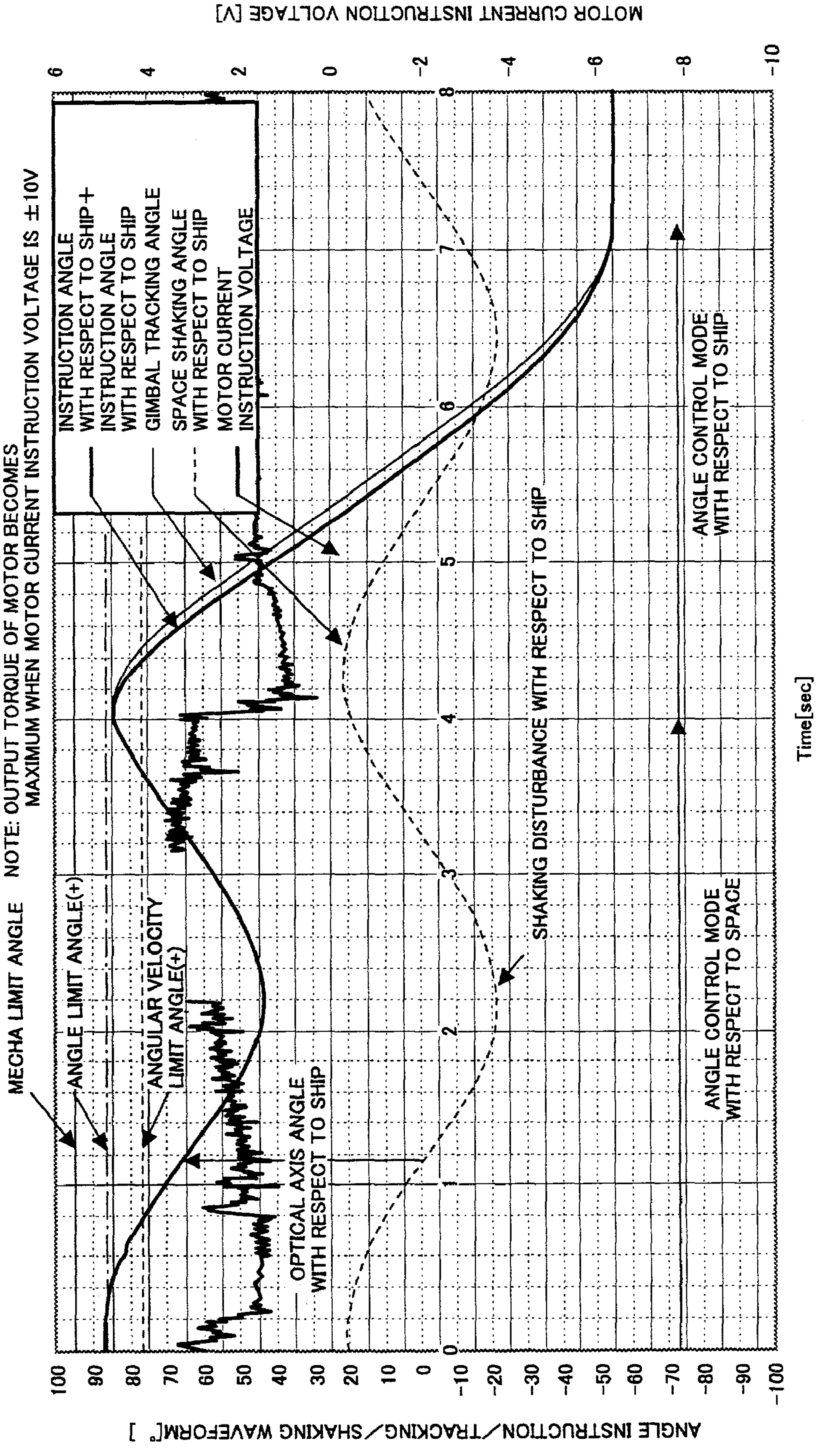
FIG. 32 shows an example of a simulation in which the angle control mode with respect to space M2 is switched to the angle control mode with respect to ship M1 according to the present invention.

FIG. 32 shows an example of a simulation in which the angle control mode with respect to space M2 is switched to the angle control mode with respect to ship M1 according to the present invention. The lateral axis indicates elapsed time [second], the left horizontal axis indicates instruction angle with respect to ship, gimbal tracking angle, ship shaking angle [°]. The right horizontal axis indicates a motor current instruction voltage [Volt]. In the figure, simulation results (instruction angle with respect to ship, gimbal tracking angle, ship shaking angle plotted, motor current instruction voltage) are plotted. The motor current instruction voltage is a scale factor in which rated torque is output in ±10V.

In the angular velocity control mode region with respect to space (from 0 to 4 second), the optical axis is spatially stabilized for space shaking disturbance with respect to ship in a state of large space optical axis angle with respect to ship, in which the gimbal is driven from the angle position with respect to ship to the housing position (−55°) at the time of switching to the angle control mode with respect to ship (4 second).

In this simulation example, an operation in the vicinity of the gimbal mecha-limit is shown where the instruction angle with respect to ship exceeds the angular velocity limit angle (+) set by the operation parameter setting/reflecting processor 124A and extends to the angle limit angle with respect to ship (+).

As shown in this figure, the angular velocity reflection processor works normally from the angular velocity limit angle with respect to ship (+) to the angle limit angle with respect to ship (+) and the gimbal tracking angle exceeds the angle limit angle with respect to ship (+) and does not over shoot.

At the time of control mode switching (4 second) and in an area in which the angular velocity limit angle with respect to ship (+) is exceeded, the motor current instruction voltage does not change excessively and it operates stably.

In addition, by the processor 147 for storing angle with respect to ship, when the mode is switched from the angular velocity control mode with respect to space M3, the optical axis angle with respect to ship is stored/reflected, and the external angular velocity instruction is separated so that the angle loop is connected and reflected. Thus, instantaneous switching can be realized.

Figure 33:
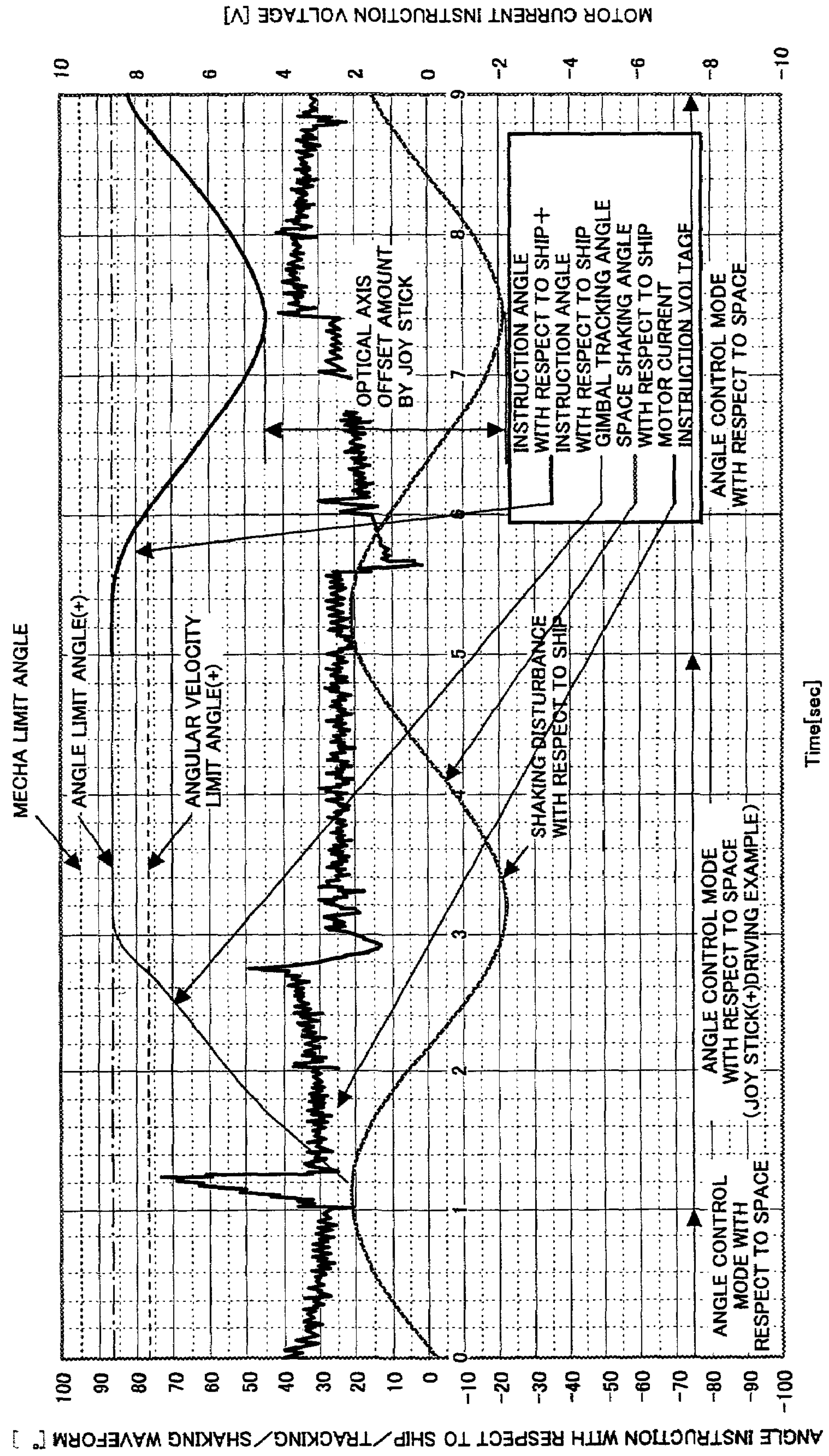
FIG. 33 shows an example of a simulation in which the angle control mode with respect to space M2 is switched to the angular velocity control mode with respect to space M3 according to the present invention.

FIG. 33 shows an example of a simulation in which the angle control mode with respect to space M2 is switched to the angular velocity control mode with respect to space M3 according to the present invention. The lateral axis indicates elapsed time [second], the left horizontal axis indicates instruction angle with respect to ship, gimbal tracking angle, ship shaking angle [°]. The right horizontal axis indicates a motor current instruction voltage [Volt]. In the figure, simulation results (instruction angle with respect to ship, gimbal tracking angle, ship shaking angle plotted, motor current instruction voltage) are plotted. The motor current instruction voltage is a scale factor in which rated torque is output in ±10V.

In the angle control mode with respect to space region (from 0 to 1 second), the optical axis is spatially stabilized in a state where the space optical axis angle with respect to ship is 0°, in which the optical axis angle is controlled such that the angle becomes the same as the space shaking angle with respect to ship. At the time of switching (1 second), the angle control mode with respect to space M2 is instantaneously switched to the space angular velocity control mode M3.

In this example, in the angular velocity control mode with respect to space region (from 1 to 5 second), it is assumed that the external angular velocity instruction signal with respect to space is always being applied by a maximum angular velocity (in which the gimbal stops before the gimbal mecha-limit according to functions of the present invention in the vicinity of the gimbal mecha-limit).

It can be recognized that, after switching to the angular velocity with respect to ship (1 second), the external angular velocity instruction with respect to space is reflected so that the gimbal optical axis exceeds the angular velocity limit angle with respect to ship (+) and stops a the angle limit angle with respect to ship (+) smoothly.

At the time (5 second) of switching from the angular velocity control mode with respect to ship to the angle control mode with respect to space, the optical axis angle is stored in the processor 147 for storing angle with respect to ship, and smooth switching is performed by the processor of switching instruction angle with respect to ship. Thus, some time is required until the excess angle from the angle limit angle with respect to ship (+) returns to a range within the angle limit angle with respect to ship (+).

In the figure, as is understood from plots of the motor current instruction voltage, transient voltage change is not shown in the control mode switching operation and in the vicinity of the gimbal mecha-limit, and the gimbal operates stably.

As mentioned above, according to the present invention, since the positioning control apparatus includes a part for reflecting a control process performed by a control mode before being switched in a control process performed by a control mode after being switched when a control mode is switched to another control mode, an accurate positioning control apparatus and method for performing switching between control modes smoothly can be provided.

In the apparatus, an operation parameter on the control mode before being switched may be dynamically reflected in the control mode after being switched. In addition, the part may include an operation parameter setting/reflecting processing part for calculating ratios at which an operation parameter of a control mode and an operation parameter of a control mode before being switched are reflected in the control mode after being switched, and controlling a corresponding feedback loop by using the ratios.

In addition, the part may operate a plurality of control modes at the same time in the vicinity of physical limit of positioning of the object to be controlled.

Accordingly, in the operation of stop/recover near the mecha-limit point, stable tracking operation can be performed, and the apparatus can be driven by a small motor having a small torque output.

In addition, a positioning control apparatus of the present invention may includes: an angle loop including an angle sensor which detects an angle of an object to be controlled with respect to a predetermined reference; an angular velocity loop including a first angular velocity sensor which detects an angular velocity of the object to be controlled with respect to the predetermined reference; an angular acceleration loop including a second angular velocity sensor which detects an angular velocity of the object to be controlled with respect to space; a first processor for controlling the angle loop by changing a reflection ratio of an angle detected by the angle sensor; a second processor for controlling the angular velocity loop by changing reflection ratios of angular velocities detected by the first angular velocity sensor and the second angular velocity sensor; and a third processor for controlling the angular acceleration loop by changing gain of the angular acceleration loop.

According to this invention, suppression against disturbance can be improved, and the apparatus can be controlled in a state where optical axis stabilizing control error is very small. In addition, mode switching and tracking can be performed with small torque without waiting for start of switching.

The positioning control apparatus further may include an operation parameter setting/reflecting processor for storing settings of operation parameters of the first, second and third processors, reflection ratios of the first and second processors, and an equation for calculating gain of the third processor. In addition, the operation parameter setting/reflecting processor stores an equation for calculating values by which a driving apparatus used for positioning the object to be controlled can operate within an allowable operation range.

In addition, the positioning control apparatus may further includes a fourth processor for operating both of the angle loop and the angular acceleration loop in the vicinity of physical limit for positioning the object to be controlled.

The fourth processor may operate both of the angle loop and the angular velocity loop, and performs control such that movement of the object to be controlled changes nonlinearly with respect to change of angle of the object to be controlled with respect to the predetermined reference. In addition, the fourth processor may include a limiter for performing control such that change of angle of the object to be controlled with respect to the predetermined reference does not exceed a predetermined range.

The present invention is not limited to the specifically disclosed embodiments, and variations and modifications may be made without departing from the scope of the invention. For example, it includes control of gimbal mounted on a body other than the ship. In addition, the controlled object is not limited to the camera.

What is claimed is:

1. A positioning control apparatus comprising:

feedback loops according to a plurality of control modes which control positioning of an object to be controlled; and a part configured to reflect an operation parameter of a first control mode in a second control mode when a control is switched from the first control mode to the second control mode, wherein said plurality of control modes include an angle loop for controlling an angle of said object to be controlled, an angular velocity loop for controlling an angular velocity of said object to be controlled, and an angular acceleration loop for controlling an angular acceleration of said object to be controlled.

2. The positioning control apparatus as claimed in claim 1, wherein said part operates a plurality of control modes at the same time in the vicinity of physical limit of positioning of said object to be controlled.

3. The positioning control apparatus as claimed in claim 1, wherein said object to be controlled includes a gimbal.

4. A positioning control apparatus comprising:

feedback loops according to a plurality of control modes which control positioning of an object to be controlled;

a part configured to reflect an operation parameter of a first control mode in a second control mode when a control is switched from the first control mode to the second control mode; and an operation parameter setting/reflecting processing part configured to calculate ratios at which an operation parameter of a control mode and the operation parameter of said first control mode are reflected in said second control mode, and controlling a corresponding feedback loop by using said ratios.

5. A positioning control apparatus comprising:

an angle loop including an angle sensor which detects an angle of an object to be controlled with respect to a predetermined reference;

an angular velocity loop including a first angular velocity sensor which detects an angular velocity of said object to be controlled with respect to said predetermined reference;

an angular acceleration loop including a second angular velocity sensor which detects an angular velocity of said object to be controlled with respect to space;

a first processor for controlling said angle loop by changing a reflection ratio of an angle detected by said angle sensor;

a second processor for controlling said angular velocity loop by changing reflection ratios of angular velocities detected by said first angular velocity sensor and said second angular velocity sensor; and a third processor for controlling said angular acceleration loop by changing gain of said angular acceleration loop.

6. The positioning control apparatus as claimed in claim 5, said positioning control apparatus further comprising:

an operation parameter setting/reflecting processor for storing settings of operation parameters of said first, second and third processors, reflection ratios of said first and second processors, and an equation for calculating gain of said third processor.

7. The positioning control apparatus as claimed in claim 6, wherein said operation parameter setting/reflecting processor stores an equation for calculating values by which a driving apparatus used for positioning said object to be controlled can operate within an allowable operation range.

8. The positioning control apparatus as claimed in claim 5, said positioning control apparatus further comprising:

a fourth processor for operating both of said angle loop and said angular acceleration loop in the vicinity of physical limit for positioning said object to be controlled.

9. The positioning control apparatus as claimed in claim 8, said positioning control apparatus further comprising:

an operation parameter setting/reflecting processor for storing setting of an operation parameter of said fourth processor and definition of said vicinity of physical limit.

10. The positioning control apparatus as claimed in claim 5, wherein said fourth processor operates both of said angle loop and said angular velocity loop, and performs control such that movement of said object to be controlled changes nonlinearly with respect to change of angle of said object to be controlled with respect to said predetermined reference.

11. The positioning control apparatus as claimed in claim 5, said fourth processor comprising a limiter for performing control such that change of angle of said object to be controlled with respect to said predetermined reference does not exceed a predetermined range.

12. The positioning control apparatus as claimed in claim 5, said positioning control apparatus further comprising:

a switch part for selectively turning on said angle loop and said angular velocity loop.

13. A positioning control method using feedback loops according to a plurality of control modes which control positioning of an object to be controlled, said positioning control method comprising the steps of:

controlling positioning of the object to be controlled using the feedback loops in a first control mode; and reflecting an operation parameter of the first control mode in a second control mode when a control is switched from the first control mode to the second control mode, wherein said plurality of control modes include an angle loop for controlling an angle of said object to be controlled, an angular velocity loop for controlling an angular velocity of said object to be controlled and an angular acceleration loop for controlling an angular acceleration of said object to be controlled.

14. A positioning control method using an angle loop including an angle sensor which detects an angle of an object to be controlled with respect to a predetermined reference, an angular velocity loop including a first angular velocity sensor which detects an angular velocity of said object to be controlled with respect to said predetermined reference, and an angular acceleration loop including a second angular velocity sensor which detects an angular velocity of said object to be controlled with respect to space, said method comprising the steps of:

controlling said angle loop by changing a reflection ratio of an angle detected by said angle sensor;

controlling said angular velocity loop by changing reflection ratios of angular velocities detected by said first angular velocity sensor and said second angular velocity sensor; and controlling said angular acceleration loop by changing gain of said angular acceleration loop.

* * * * *